(12) United States Patent
Abudalfa et al.

(10) Patent No.: US 11,227,120 B2
(45) Date of Patent: Jan. 18, 2022

(54) OPEN DOMAIN TARGETED SENTIMENT CLASSIFICATION USING SEMISUPERVISED DYNAMIC GENERATION OF FEATURE ATTRIBUTES

(71) Applicant: King Fahd University of Petroleum and Minerals, Dhahran (SA)

(72) Inventors: Shadi Abudalfa, Dhahran (SA); Moataz Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 262 days.

(21) Appl. No.: 16/599,951

(22) Filed: Oct. 11, 2019

(65) Prior Publication Data
US 2020/0349229 A1 Nov. 5, 2020

Related U.S. Application Data

(60) Provisional application No. 62/841,956, filed on May 2, 2019.

(51) Int. Cl.
*G06F 17/00* (2019.01)
*G06F 40/30* (2020.01)
(Continued)

(52) U.S. Cl.
CPC ............ *G06F 40/30* (2020.01); *G06F 40/295* (2020.01); *G06N 5/04* (2013.01); *G06N 20/10* (2019.01)

(58) Field of Classification Search
None
See application file for complete search history.

(56) References Cited

U.S. PATENT DOCUMENTS 9,213,997 B2 * 12/2015 Chatterjee ............ G06Q 10/107
9,779,085 B2 * 10/2017 Wick .................... G06F 40/242
(Continued)

FOREIGN PATENT DOCUMENTS

CN 106980650 A 7/2017

OTHER PUBLICATIONS

Yu, et al. ; A Semi-supervised Learning Approach for Microblog Sentiment Classification ; 2015 IEEE International Conference on Smart City/SocialCOm/SustainCom together with DataCom 2015 and SC2 2015; 2015 ; 6 Pages.
(Continued)

*Primary Examiner* — Satwant K Singh
(74) *Attorney, Agent, or Firm* — Oblon, McClelland, Maier & Neustadt, L.L.P.

(57) ABSTRACT

Methods for classification of microblogs using semi-supervised open domain targeted sentiment classification. A hidden Markov model support vector machine (SVM HMM) is trained with a training dataset combined with discrete features. A portion of the training dataset is clustered by k-means clustering to generate cluster IDs which are normalized and combined with the discrete features. After formatting, the combined dataset is applied to the SVM HMM and the C parameter, which is optimized by calculating a zero-one error at each iteration. The open domain targeted sentiment classification methods uses less labelled data than previous sentiment analysis techniques, thus decreasing processing costs. Additionally, a supervised learning model for improving the accuracy of open domain targeted sentiment classification is presented using an SVM HMM.

18 Claims, 10 Drawing Sheets

(51) Int. Cl.
*G06N 5/04* (2006.01)
*G06N 20/10* (2019.01)
*G06F 40/295* (2020.01)

(56) References Cited

U.S. PATENT DOCUMENTS

| | | | |
|---|---|---|---|
| 2012/0296845 A1* | 11/2012 | Andrews | G06Q 40/06 705/36 R |
| 2012/0316916 A1* | 12/2012 | Andrews | G06Q 10/0635 705/7.28 |
| 2017/0352069 A1 | 12/2017 | Deluca et al. | |
| 2018/0165554 A1 | 6/2018 | Zhang et al. | |
| 2018/0341839 A1 | 11/2018 | Malak et al. | |
| 2019/0065626 A1 | 2/2019 | Cameron et al. | |
| 2019/0065986 A1* | 2/2019 | Witbrock | G06N 20/00 |

OTHER PUBLICATIONS

Aichner, et al. ; Measuring the Degree of Corporate Social Media Use ; International Journal of Market Research ; Jan. 2015 ; 20 Pages.

Mitchell, et al. ; Open Domain Targeted Sentiment; Proceedings of the 2013 Conference on Empirical Methods in Natural Language Processing ; pp. 1643-1654 ; Oct. 2013 ; 12 Pages.

Zhang, et al. ; Neural Networks for Open Domain Targeted Sentiment; Proceedings of the 2015 Conference on Empirical Methods in Natural Language Processing ; pp. 612-621 ; Sep. 2015 ; 10 Pages.

Qi, et al. ; Semi-Supervised Sequence Labeling with Self-Learned Features ; 10 Pages.

Kaplan, et al. ; The early bird catches the news: Nine things you should know about micro-blogging ; Business Horizons 54 ; pp. 105-113 ; 2011 ; 3 Pages.

Lohmann, et al. ; Visual Analysis of Microblog Content Using Time-Varying Co-occurrence Highlighting in Tag Clouds ; Proceedings of the International Working Conference on Advanced Visual Interfaces ; 2012 ; 4 Pages.

* cited by examiner

OPEN DOMAIN TARGETED SENTIMENT CLASSIFICATION USING SEMISUPERVISED DYNAMIC GENERATION OF FEATURE ATTRIBUTES

STATEMENT REGARDING PRIOR DISCLOSURE BY THE INVENTORS

Aspects of this technology are described in an article "Open Domain Targeted Sentiment Classification Using Semi-Supervised Dynamic Generation of Feature Attributes" published in Journal of Universal Computer Science, Vol. 24, No. 11 (2018), 1582-1603, on Nov. 28, 2018, which is incorporated herein by reference in its entirety.

STATEMENT OF ACKNOWLEDGEMENT

The inventors acknowledge King Fahd University of Petroleum and Minerals (KFUPM) for providing the facilities to support this work.

BACKGROUND

Technical Field

The present disclosure is directed to open domain targeted sentiment classification using semi-supervised dynamic generation of feature attributes to determine topics in micro-blogs and identify sentiment expressed toward the topics.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sentiment analysis is area which has increased in importance with natural language processing (NLP). Sentiment analysis mines opinions that are included in text with the goal of discovering insights into human behavior and opinion. Sentiment analysis has been employed in numerous applications, such as consumer product marketing and political opinion mining. (See Chamlertwat, W., Bhattarakosol, P., Rungkasiri, T., Haruechaiyasak, C.: "Discovering Consumer Insight from Twitter via Sentiment Analysis"; Journal of Universal Computer Science, 18, 8 (2012) 973-992; See Liu, B.: "Sentiment Analysis: Mining Opinions, Sentiments, and Emotions"; Cambridge University Press (2015), each incorporated herein by reference in its entirety).

Micro-blogging is an online broadcast medium that exists as a specific form of blogging. A micro-blog differs from a traditional blog in that its content is typically smaller in both actual and aggregated file size. Micro-blogs allow users to exchange small elements of content such as short sentences, individual images, or video links. These small messages are sometimes called micro-posts. As with traditional blogging, micro-bloggers post about topics ranging from the simple, such as "what I'm doing right now," to the thematic, such as "sports cars." Commercial micro-blogs also exist to promote websites, services and products, and to promote collaboration within an organization. Micro-blogs may include text messaging, instant messaging, E-mail, or links to websites. Any kind of activity involving posting, whether on a social network site or a micro-blogging site, can be classified as micro-blogging (See Kaplan A., Haenlein M. (2011). "The early bird catches the news: Nine things you should know about micro-blogging" (PDF). Business Horizons, 54(2). March-April 2011; Aichner, T.; Jacob, F., "Measuring the Degree of Corporate Social Media Use". International Journal of Market Research, 57 (2): 257-275. doi:10.2501/IJMR-2015-018, March 2015; Lohmann et al. (2012). "Visual Analysis of Microblog Content Using Time-Varying Co-occurrence Highlighting in Tag Clouds", AVI 2012 Conference, each incorporated herein by reference in its entirety).

Microblogging services have been significantly increasing in number and activity and have enabled people to conveniently share their sentiments (opinions) with regard to matters of concerns. Such sentiments have shown an impact on many fields such as economics and politics. Different sentiment analysis approaches have been proposed in the literature to automatically predict sentiments shared in micro-blogs (e.g., tweets). A class of such approaches predicts opinion towards specific target (entity); this class is referred to as target-dependent sentiment classification. Another class, called open domain targeted sentiment classification, extracts targets from the micro-blog and predicts sentiment towards the target.

Many techniques have been proposed for detecting polarities expressed in micro-blogs. The more formal approach is based on identifying sentiment (opinion) that is expressed toward the whole micro-blog. This approach cannot detect more than one sentiment even if the micro-blog includes more than one topic (target). Some techniques manipulate a weakness in the target-independent approach by predicting sentiment toward a specific target included in the micro-blog, which is referred to as target-dependent sentiment classification.

For example, if a micro-blog is analyzed for the phrase "Concorde is better than Boeing for long trips" by using the target-independent approach, the predicated sentiment will be a "positive" sentiment since the micro-blog contains the positive phrase "better than". While applying target-dependent sentiment classification will output "positive" sentiments if the interested target is "Concorde", the output will be a "negative" sentiment when the requested target is "Boeing".

Another approach first predicts the named entities (targets) in the micro-blog and then identifies sentiments toward them. Referring to the above example, the system will first detect the words "Concorde" and "Boeing" as targets and then identify sentiments toward them as discussed previously. This recent approach is referred to as open domain targeted sentiment analysis.

One approach to open domain targeted sentiment classification joined two tasks: named entity recognition (NER) and targeted sentiment classification. NER identified named entities (targets) in a micro-blog, while targeted sentiment classification predicted sentiment polarities toward identified targets. (See Mitchell, M., Aguilar, J., Wilson, T., Durme, B.: "Open domain targeted sentiment"; Proc. of the Conference on Empirical Methods in Natural Language Processing (EMNLP) (2013); Ratinov, L., Roth, D.: "Design Challenges and Misconceptions in Named Entity Recognition"; Proc. of the 13th Conference on Computational Natural Language Learning, Stroudsburg, Pa., (2009) 147-155, each incorporated herein by reference in its entirety).

Another approach uses sequence labelling, in which a sequence of words (tokens) that forms each micro-blog must be analyzed. To classify a sequence of words, a technique from neuro-linquistic programming (NLP) called "sequence labelling" is used. In machine learning, sequence labeling is a type of pattern recognition task that involves the algorithmic assignment of a categorical label to each member of a sequence of observed values. A common example of a sequence labeling task is part of speech tagging, which seeks to assign a part of speech to each word in an input sentence or document. Sequence labeling can be treated as a set of independent classification tasks, one per member of the sequence. However, accuracy is generally improved by making the optimal label for a given element dependent on the choices of nearby elements, using special algorithms to choose the globally best set of labels for the entire sequence at once. (See Nguyen, N., Guo, Y. "Comparisons of Sequence Labeling Algorithms and Extensions"; Proc. of the 24th International Conference on Machine Learning (2007) 681-688, incorporated herein by reference in its entirety).

Approaches similar to open domain targeted sentiment analysis are based on aspect-oriented sentiment analysis which extracts product attributes from user reviews and predicts opinions towards them. The difference between "target" and "aspect" is that "target" refers to an independent topic (entity) included in the micro-blog. The micro-blog may include more than one target. An "aspect" refers to a subtopic that is related to a main topic. For example, the micro-blogger may talk about features that are related to a specific product. Thus, all features are detected as aspects. (See Hu, M., Liu, B.: "Mining and summarizing customer reviews"; Proc. of SIGKDD (2004) 168-177; and Popescu, A., Etzioni, O.: "Extracting product features and opinions from reviews"; In Natural language processing and text mining (2007), each incorporated herein by reference in their entirety). Moreover a topic-oriented sentiment analysis for extracting features and sentiments towards certain topics has conventionally been employed. (See Wang, X., Wei, F., Liu, X., Zhou, M., Zhang, M.: "Topic sentiment analysis in twitter: a graph-based hashtag sentiment classification approach"; In CIKM (2011) 1031-1040, incorporated herein by reference in its entirety).

Word embeddings may improve the accuracy of open domain targeted sentiment classification. (See Mikolov, T., Chen, K., Corrado, G., Dean, J.: "Efficient estimation of word representations in vector space"; Proc. of International Conference on Learning Representations (2013), incorporated herein by reference in its entirety). Word embeddings is a technique of substituting each token (word) in a micro-blog by a numerical vector. Word embeddings preserve the similarity between similar words in meaning. Thus, word embeddings convert words to vectors while the similarity between vectors mimics semantic similarity between words. As a result, the technique of using word embeddings has improved the performance of many applications used in deep learning and NLP.

A semi-supervised learning technique for open domain targeted sentiment classification has not previously been explored. (See Abudalfa, S., Ahmed, M.: "Survey on Target Dependent Sentiment Analysis of Micro-Blogs in Social Media"; Proc. 9th IEEE GCC Conference & Exhibition (2017), incorporated herein by reference in its entirety). The use of a supervised learning technique for open domain targeted sentiment analysis requires a large amount of labelled data during the process of training models. Thus, applying a supervised learning technique to labelled micro-blogs is a difficult task since annotating micro-blogs is a time consuming process and is subject human error. However, automated systems for annotating micro-blogs have been found to yield inaccurate results. Additionally, using the open domain targeted sentiment approach compounds the problem, since labels must be provided for both NER and sentiment prediction.

Accordingly, it is one object of the present disclosure to provide methods and systems for sentiment analysis based on semi-supervised learning which provides open domain targeted sentiment classification using less labelled data, thus decreasing processing costs. Additionally, a supervised learning model for improving the accuracy of open domain targeted sentiment classification is presented using SVM HMM.

Results of experiments demonstrate that semi-supervised based open domain targeted sentiment classification improves the performance of named entity recognition and sentiment prediction for both English and Spanish micro-blogs.

SUMMARY

In an exemplary embodiment, a semi-supervised learning method for generating feature attributes in open domain targeted sentiment classification of a dataset of microblogs is described as comprising training, with a computing system having circuitry configured for modeling and processing, a hidden Markov model support vector machine (SVM HMM) by the steps of dynamically generating feature attributes by combining pre-trained word embeddings from a plurality of different sources to form a first training dataset, normalizing the first training dataset to generate a normalized training dataset, concatenating, with a summer, discrete features with the normalized training set to form a second training dataset. Dynamically generating feature attributes includes selecting a subset of the training dataset, applying k-means clustering to the subset, determining the cluster IDs for the training dataset, normalizing the cluster IDs and concatenating the normalized cluster IDs as additional attributes with the second dataset for forming a third dataset and formatting the third dataset. The method further includes initializing a C parameter, applying the second training dataset with the C parameter to the SVM HMM, and training the SVM HMM to classify the second training dataset set. The training includes optimizing the initialization of the C parameter by replacing the C parameter with incrementally increased values. The method further includes identifying topics and sentiment polarities within a dataset of micro-blogs by concatenating the generated attributes with word embeddings included in the dataset of micro-blogs, normalizing the word embedded dataset of micro-blogs, formatting the normalized word embedded dataset of micro-blogs to form a formatted dataset, classifying the formatted dataset by applying the formatted dataset to the trained SVM HMM, and outputting a sentiment analysis (detected topics and identified sentiments expressed toward the topics) of the dataset of micro-blogs.

In another exemplary embodiment, a non-transitory computer readable medium having instructions stored therein that, when executed by one or more processor, cause the one or more processors to perform a semi-supervised learning method comprising training a SVM HMM model to classify micro-blogs for open domain targeted sentiment analysis.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
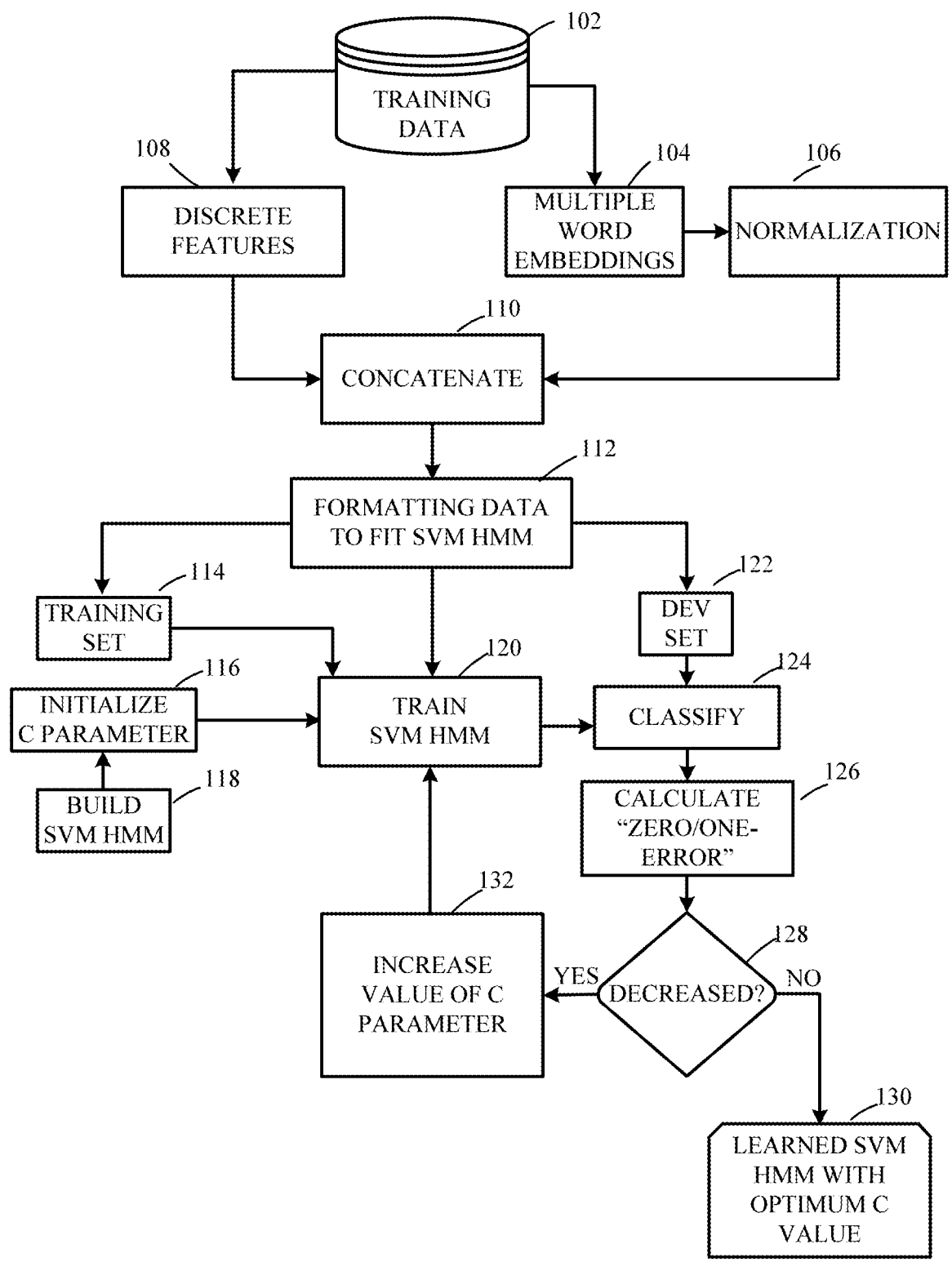
FIG. 1 is a flowchart for training an SVM HMM model combining discrete features with multiple word embeddings.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The term "semantic web" refers to a web of data that can be processed directly and indirectly by machines. The Semantic Web is an extension of the World Wide Web through standards by the World Wide Web Consortium (W3C). The standards promote common data formats and exchange protocols on the Web, most fundamentally the Resource Description Framework (RDF). According to the W3C, "The Semantic Web provides a common framework that allows data to be shared and reused across application, enterprise, and community boundaries". The Semantic Web is therefore regarded as an integrator across different content, information applications and systems. (See "XML and semantic web W3C standards timeline", Feb. 4, 2012, http://www.dblab.ntua.gr/~bikakis/XML%20and%20Semantic%20Web%20W3C%20Standards%20Timeline-History.pdf; and "W3C Semantic Web Activity", Nov. 7, 2011, https://www.w3.org/2001/sw/, each incorporated herein by reference in its entirety).

The term "word embeddings" refers to the substitution of each token (word) in a micro-blog by a numerical vector. Word embeddings preserve the similarity between similar words in meaning. Thus, word embeddings convert words to vectors while the similarity between vectors mimics semantic similarity between words.

The term "targeted sentiment classification" refers to predicting sentiment polarities of identified targets.

The term "open domain" as used in the present disclosure refers to online data generated by social media, newspapers, blogs, i.e., any source of data which is published and freely available from the World Wide Web.

The term "micro-blog" refers to short posts, texts, instant messaging, etc., usually found on social media.

The term "open domain targeted sentiment classification" refers to identifying sentiment polarities in open domain micro-blogs by detecting topics in the micro-blogs and identifying the sentiments expressed.

The term "semi-supervised learning" refers to a class of machine learning tasks and techniques that make use of unlabeled data for training, typically a small amount of labeled data with a large amount of unlabeled data. Semi-supervised learning falls between unsupervised learning (without any labeled training data) and supervised learning (with completely labeled training data).

The phrase "discrete features" refers to categories of attributes that take only a specific value amongst a set of all possible values.

Aspects of the present disclosure describe semi-supervised based methods for open domain targeted sentiment analysis of English and Spanish micro-blogs in order to improve the performance of named entity recognition (NER) and sentiment prediction using partially labelled data.

Aspects of this disclosure are directed to a semi-supervised learning by dynamically generating feature attributes for open domain targeted sentiment classification of a dataset of microblogs, a method for determining sentiment in a dataset of micro-blogs and a non-transitory computer readable medium having instructions stored therein that, when executed by one or more processors, causes the one or more processors to perform a semi-supervised learning method by dynamically generating feature attributes for open domain targeted sentiment classification of a dataset of microblogs.

Further aspects of the present disclosure employ methods for mining the semantic web by using word embeddings to improve the accuracy of open domain targeted sentiment classification.

Open Domain Targeted Sentiment

As open domain targeted sentiment classification must first identify all named entities in a micro-blog by employing named entity recognition (NER). Secondly, the named entities which represent the targets in the micro-blog must be identified. Thereby the problem is converted from the sentence level to a word (token) level. Thus, a sequence of words (tokens) that forms each micro-blog must be analyzed. To classify the sequence of words, a technique employed for natural language processing (NLP), called "sequence labelling" is used. (See Nguyen, N., Guo, Y. "Comparisons of Sequence Labeling Algorithms and Extensions"; Proc. of the 24th International Conference on Machine Learning (2007) 681-688, incorporated herein by reference in its entirety).

Thus, open domain targeted sentiment classification represents each microblog as a sentence of tokens, then sequence labelling identifies all named entities that are related to persons, organizations, etc.

One strategy used for sequence labelling is called BIO. This strategy uses a "B" tag to identify the beginning of named entity, an "I" tag for determining tokens inside the named entity, otherwise the token will be labelled as "O"

(outside) tag. (See "Sequence Labeling", page 44, CSE 40/60657: Natural Language Processing, Feb. 18, 2015, incorporated herein by reference in its entirety).

Sequence labelling can be developed by using a hidden Markov model (HMM) or conditional random field (CRF). (See Altun, Y., Tsochantaridis, I., Hofmann, T.: "Hidden Markov Support Vector Machines"; Proc. of the 20th International Conference on Machine Learning (ICML), Washington D.C. (2003) 3-10; and Keerthi, S., Sundararajan, S.: "CRF versus SVM-Struct for Sequence Labeling"; Technical report, Yahoo! Research (2007), each incorporated herein by reference in their entirety).

In probability theory, a Markov model is a stochastic model used to model randomly changing systems. Future states are assumed to depend only on the current state, not on the events that occurred before it. This assumption enables reasoning and computation with the model that would otherwise be intractable. For this reason, in the fields of predictive modelling and probabilistic forecasting, it is desirable for a given model to exhibit the Markov property.

A Hidden Markov Model (HMM) is a statistical Markov model in which the system being modeled is assumed to be a Markov process with unobservable (i.e. hidden) states. In simpler Markov models (like a Markov chain), the state is directly visible to the observer, and therefore the state transition probabilities are the only parameters, while in the hidden Markov model, the state is not directly visible, but the output (in the form of data or a "token") dependent on the state is visible. Each state has a probability distribution over the possible output tokens.

Therefore, the sequence of tokens generated by an HMM gives some information about the sequence of states. The adjective "hidden" refers to the state sequence through which the model passes, not to the parameters of the model; the model is still referred to as a hidden Markov model even if these parameters are known exactly.

Conditional random fields (CRFs) are a class of statistical modeling method often applied in pattern recognition and machine learning and used for structured prediction. CRFs fall into a sequence modeling family. Whereas a discrete classifier predicts a label for a single sample without considering "neighboring" samples, a CRF can take context into account; e.g., the linear chain CRF and predict sequences of labels for sequences of input samples.

In aspects of the present disclosure, a hidden Markov support vector machine (SVM MIM) is used to improve the accuracy of open domain targeted sentiment classification. SVM HMM is a model of sequence tagging with structural support vector machines (SVM) combined with a hidden Markov model.

Performance Evaluation

Different types of metrics have been used to evaluate the performance of open domain targeted sentiment classification in the state of the art. Open domain targeted sentiment classification concerns sequence labelling in which classification accuracy is calculated by using two specific metrics. The first metric is referred to as Acc-All (accuracy of all) which measures the accuracy of the entire named entity tags (including O labels) along with the sentiment tag. The second specific metric is called Acc-Bsent which measures the accuracy of identifying the beginning of a named entity (B tags) together with the sentiment expressed towards it. Zero-one loss or zero-one error is a common loss function used with classification learning. The function assigns 0 to loss for a correct classification and 1 for an incorrect classification. Zero/one-error may be reported by measuring the percentage of micro-blogs that have at least one misclassified tag. Other traditional metrics used in the present disclosure include precision, recall, and F1-score. (See Parambath, S., Usunier, N., Grandvalet, Y.: "Optimizing F-measures by Cost-Sensitive Classification"; in Neural Information Processing Systems (2014) 2123-2131, incorporated herein by reference in its entirety).

Open domain targeted sentiment classification is capable of predicting sentiments expressed in a micro-blog for any named person or organization. Any one of three models may be employed to predict the sentiments: pipeline, joint, and collapsed. A pipeline model first identifies named entities in the micro-blog, then assigns sentiments toward them. A joint model identifies named entities along with their corresponding sentiments in one shot. In the collapsed model, labels of named entity and sentiment polarity (i.e, positive or negative) are combined in one label sequence.

These three models have been compared against a baseline model in which volitional entity labels (named entity) were used without assigning sentiment directed towards the entity (the majority case) by Klinger et al. The baseline model was used to compare how the methods performed in identifying sentiment targeted along with an entity. The models were implemented by using CRF with a set of discrete features (categorical features). Additionally, a factor graph was developed for extracting both target entities and sentiment expressions. (See Klinger, R., Cimiano, P.: "Bi-Directional Inter-Dependencies of Subjective Expressions and Targets and Their Value for a Joint Model"; in the Annual Meeting of the Association for Computational Linguistics (ACL) (2013), incorporated herein by reference in its entirety).

Neural networks have been employed instead of CRF for improving accuracy in open domain targeted sentiment classification. The performance of using word embeddings (neural features) was evaluated by Zhang et al. in comparison with the discrete features used by Mitchell et al. The results were evaluated by using the dataset collected by Mitchell et al. in order to make accurate comparisons. These results showed that using both neural and discrete models together significantly improved performance of open domain targeted sentiment classification. (See Zhang, M., Zhang, Y., Vo, D.: "Neural Networks for Open Domain Targeted Sentiment"; Proc. of the Conference on Empirical Methods in Natural Language Processing (2015) 612-621, incorporated herein by reference in its entirety).

An improvement in open domain sentiment classification was achieved by Li et al., by building a graphical model for extracting both named entities and their associated sentiment polarities by using a collapsed strategy. This model used the dataset of Mitchell et al. in order to make comparisons with those of Mitchell, 2013 and Zhang, 2015. The feature engineering was based on using same discrete features that are used by Mitchell et al. and Zhang et al., in addition to obtaining more polarity information by using the same lexicons used by Mitchell et al. The results showed that this graphical model outperformed previous models. (See Li, H., Lu, W.: "Learning Latent Sentiment Scopes for Entity-Level Sentiment Analysis"; Proc. of 31st AAAI Conference on Artificial Intelligence (AAAI) (2017) 3482-3489, incorporated herein by reference in its entirety).

The present disclosure describes three methods for improving the accuracy of open domain targeted sentiment classification. The first method is based on combining discrete features with multiple word embeddings. The second method is based on employing semi-supervised learning by generating feature attributes dynamically. The third method combines supervised learning using fully labelled data with feature attributes generated dynamically.

Supervised Learning of Combined Discrete Features and Multiple Word Embeddings

Using word embeddings, or the substitution of each token (word) in a micro-blog by a numerical vector, increases the accuracy of open domain targeted sentiment classification significantly. The difficulty in using word embeddings with social media lies in finding a numeric vector which represents each word in the micro-blog. Logically, it is impossible to provide word embeddings to represent each word in a micro-blog, since bloggers may use slang words, acronyms (such as lol, rotfl, idk, asap), or text shortcuts (f2f (face to face), b3 (blah, blah, blah), otl (out to lunch)) when writing their micro-bogs. In the best case, word embeddings representing each word in a micro-blog during training of the machine learning model can be established. However, word embeddings representing each word in real life micro-blogs cannot be found when testing the model since all words used by bloggers in real life situation cannot be known. These missed word embeddings limit the accuracy of any machine leaning model.

To decrease the effect on accuracy of these missed words, pre-trained word embeddings were compiled from different resources and concatenated. Thus, the probability of missing word embeddings representing slang words is decreased. To increase accuracy of the model, the concatenated word embeddings were normalized so that they fell in the same range. Additionally, all word embeddings with discrete feature attributes (in categories) were concatenated. Some exemplary discrete features are shown in Table 5.

The SVM HMM model is employed to take into consideration the relationships between words of each sequence in micro-blogs. An advantage of using SVM HMM is that numerical (continuous) or categorical (discrete) features or a combination can be applied.

The objective of the support vector machine algorithm is to find a hyperplane in an N-dimensional space (N—the number of features) that distinctly classifies the data points.

A hidden Markov support vector machine (SVM HMM) is a machine learning algorithm for binary classification in which a linear hyperplane is learned using positive and negative training examples separated by a margin. The margin is defined as the distance of the hyperplane to the nearest of the positive and negative training examples. A C parameter is an estimate of the tradeoff between the training error and margin maximization. Accuracy of the SVM HMM algorithm is obtained by optimizing the C parameter. (See Gimenez, J., Marquez, L., "Fast and Accurate Part of Speech Tagging: The SVM Approach Revisited", January 2003, Recent Advances in Natural Language Processing III, Selected Papers from RANLP 2003, Borovets, Bulgaria, incorporated herein by reference in its entirety).

In machine learning, a common task is the study and construction of algorithms that can learn from and make predictions on data. Such algorithms work by making data-driven predictions or decisions through building a mathematical model from input data.

The data used to build the final model usually comes from multiple datasets. In particular, three data sets are commonly used in different stages of the creation of the model.

The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method. In practice, the training dataset often consist of pairs of an input vector (or scalar) and the corresponding output value, which is commonly denoted as the label. The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation.

Successively, the fitted model is used to predict the responses for the observations in a second dataset called the development dataset (devset). The development dataset provides an unbiased evaluation of a model fit on the training dataset while tuning the model's hyperparameters (e.g. the number of hidden units in a neural network). In an non-limiting example, 9% of the dataset is divided into a development set, 10% into a testing set and 81% into a training set.

Finally, the testing data is a dataset used to provide an unbiased evaluation of a final model fit on the training data. Testing data is a dataset that is independent of the training dataset, but that follows the same probability distribution of output labels as the training data.

The details for training the SVM HMM model are illustrated in the flowchart of FIG. 1. A set of training data 102 comprises a plurality of micro-blogs. Each micro-blog is converted to a vector by multiple word-embeddings (104). Each vector representing a corresponding micro-blog was normalized (106) so that all numeric values fall in the range between −1 and 1 based on the following equation:

$$X_{new} = 2\left(\frac{X - X_{min}}{X_{max} - X_{min}} - \frac{1}{2}\right) \quad (1)$$

The training data was further categorized into discrete features 108 (or category buckets).

The discrete features (108) groups of micro-blogs were concatenated (110) with the normalized vectors (106).

The concatenated data is then formatted (112) to fit the SVM HMM format requirements. The SVM HMM is built (118) and the C parameter is initialized (116). The formatted training set is then applied to train the SVM HMM model (120).

An optimization method is used to find the optimum value of the C parameter. The optimization process is conducted by increasing the value of the C parameter (132) gradually. At each selected value of C parameter, the model was tested with the development set (122) and the "zero/one-error" metric 126 was calculated. The optimum value of the C parameter was selected that provided the lowest value of "zero/one-error" metric. Although using the training set instead of using a development set (122) would provide a better optimum value of C parameter, a more realistic approach is to use the development set in the optimization process, as shown in FIG. 1, as it is more attuned to the "real" data of the micro-blogs. In later classifying a new unseen micro-blog, the trained SVM HMM model is used, which was trained by using the optimum value of the C parameter.

To check the accuracy of the optimum value of the C parameter, the trained SVM HMM model was applied to the testing data and evaluation metrics were calculated for name entity recognition (NER) and sentiment analysis (SA). The most common metrics that are used for evaluating open domain targeted sentiment classification are precision, recall, and F1-score.

Figure 2:
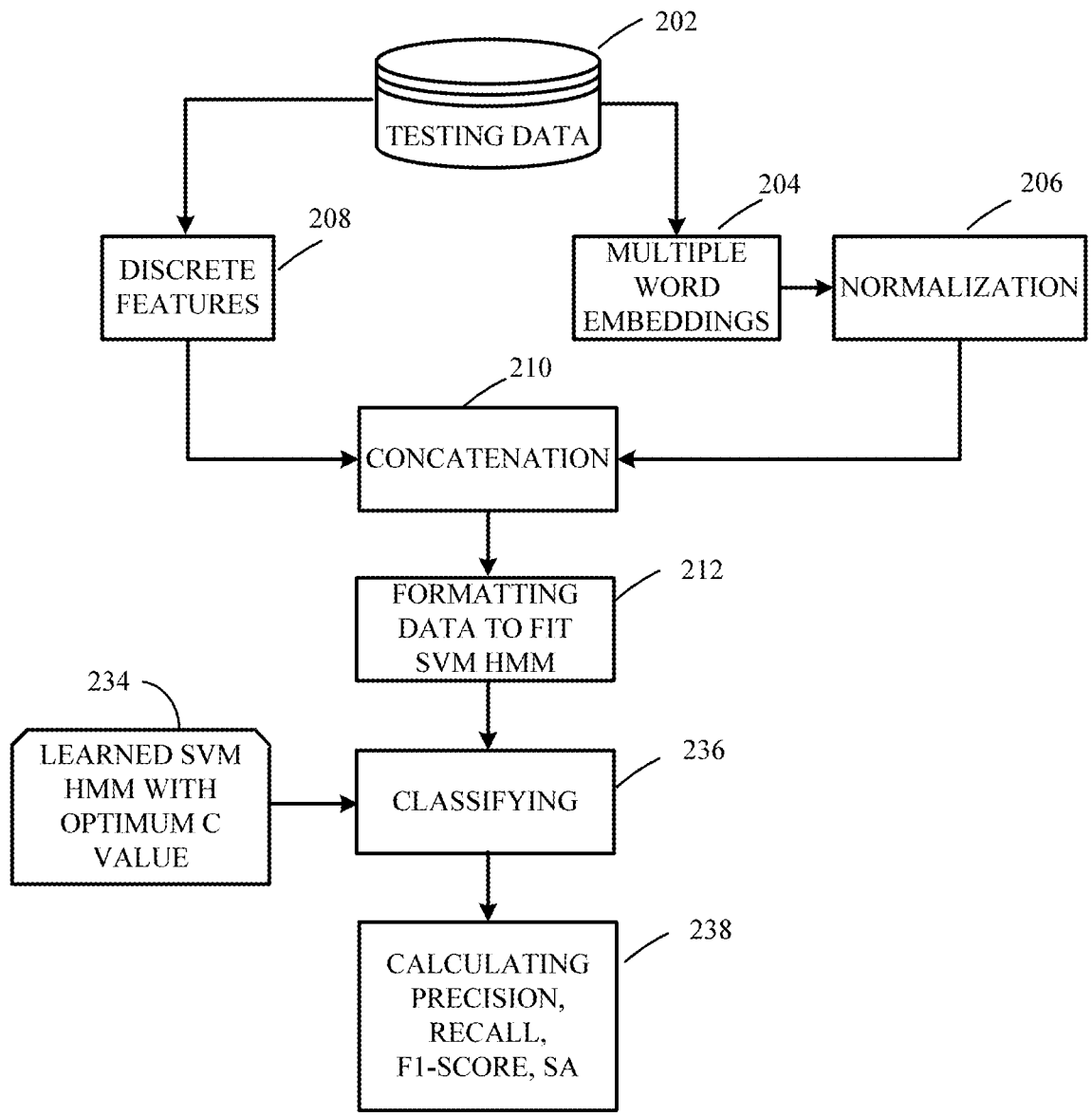
FIG. 2 is a flowchart of testing an SVM HMM model combining discrete features with multiple word embeddings.

The method used for testing the model is illustrated in FIG. 2. Word2vec embeddings of each word in the testing data are retrieved from the same sources were used to train the model. Next, the multiple word2vec embeddings (204) were concatenated (210) with the discrete features (208) as illustrated in the FIG. 2. Finally, the data format is converted to fit the format used with SVM HMM model (212) (as used with the training model of FIG. 1) to be ready for classification.

The testing data is then classified (236) using the learned SVM HMM model (120) which was optimized with the C parameter (234).

At step 238, metrics are calculated on the testing data. Satisfactory metrics verify that the SVM HMM model is correctly trained and is ready to classify an unknown set of micro-blogs.

Semi-Supervised Learning with Dynamic Generation of Feature Attributes

Figure 3:
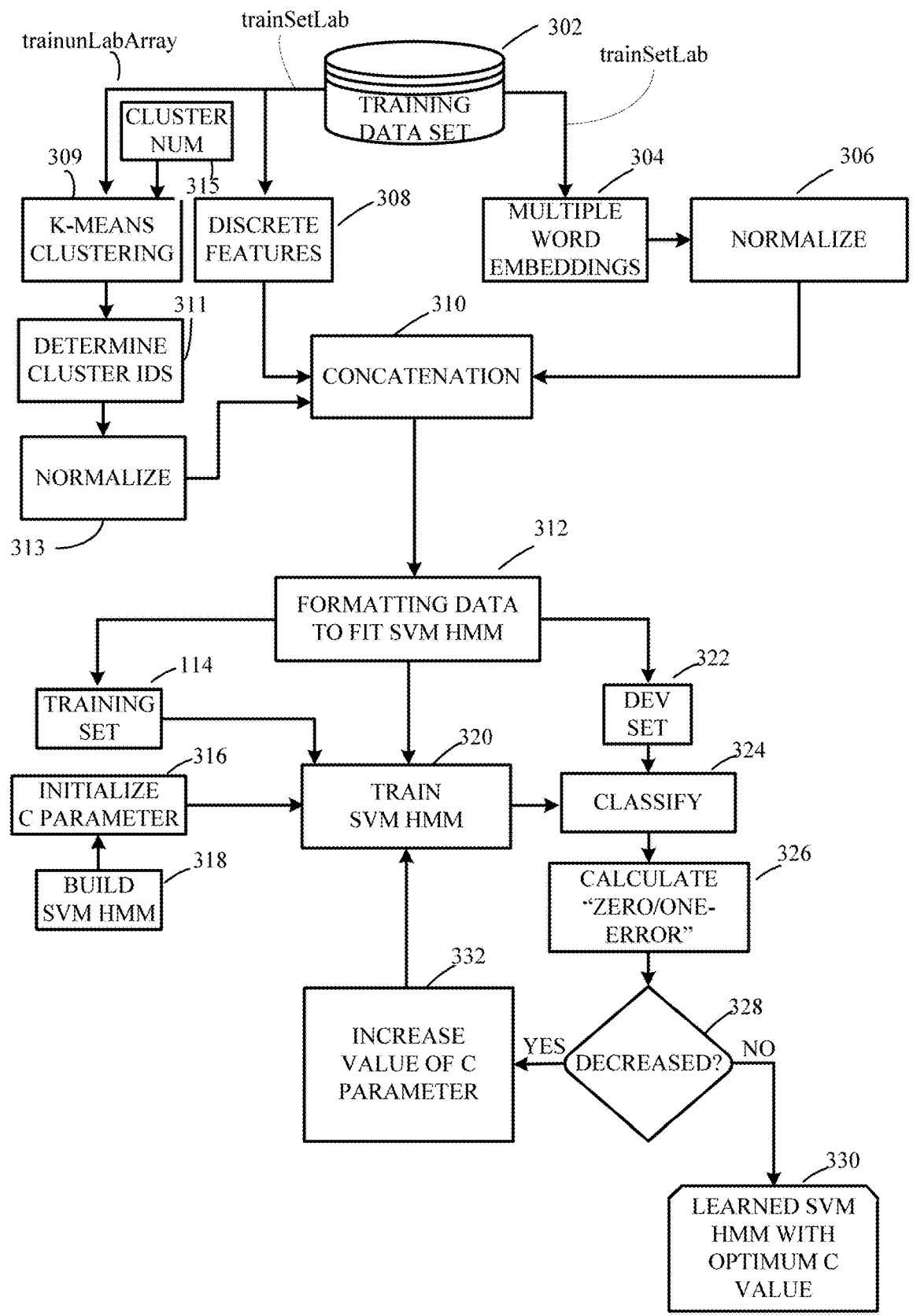
FIG. 3 is a flowchart of a semi-supervised learning technique for open domain targeted sentiment classification.

In an aspect of the present disclosure, a method is described for employing semi-supervised learning in open domain targeted sentiment classification by using both labelled and unlabeled data. The unlabeled data are clustered and added to the discrete features as shown in FIG. 3.

Traditionally, there have been two fundamentally different types of tasks in machine learning. The first one is unsupervised learning. Let $X=(x_1, \ldots, x_n)$ be a set of n examples (or points), where $x_i \in X$ for all $i \in [n]$ for $n=\{1, \ldots, n\}$. Typically it is assumed that the points are taken from a common distribution on X. The goal of unsupervised learning is to find interesting structure in the data X. Clustering is a form of unsupervised learning. The second type of task is supervised learning. The goal is to learn a mapping from x toy, given a training set made of pairs $(x_i, y_i)$. Here, they, $y_i \in Y$ are called the labels or targets of the examples x. Supervised learning may be very time intensive as it requires the annotation of a huge amount of data when preparing the labelled training set.

Semi-supervised learning (SSL) is halfway between supervised and unsupervised learning. In addition to unlabeled data, the algorithm is provided with some supervision information, but not necessarily for all examples. Often, this information will be the targets associated with some of the examples. In this case, the data set $X=(x_i)$, for $i \in [_n]$ can be divided into two parts: the points $X_1=(x_1, \ldots, x_l)$, for which labels $Y_1=(y_1, \ldots, y_l)$ are provided, and the points $X_u=(x_{l+1}, \ldots, x_{l+u})$ the labels of which are not known. (See Chapelle, O., Schölkopf, B., Zien, A.: "Semi-Supervised Learning"; The MIT Press, London, England (2006), incorporated herein by reference in its entirety).

K-means clustering is a method of vector quantization used for cluster analysis in data mining. K-means clustering aims to partition n observations into k clusters in which each observation belongs to the cluster with the nearest mean (centroid) of the least squared distances between the observations, the centroid serving as a prototype of the cluster.

The methods of the present disclosure are based on improving accuracy by generating more attributes to the horizontal level of each word (token). Thus, more attributes are added to each feature vector that represents each word (token) in each micro-blog. The method exploits a level of feature attributes, since evaluating open domain targeted sentiment analysis is based on the word level instead of micro-blog level.

Traditional semi-supervised learning techniques are not suitable for open domain targeted sentiment classification because these techniques ignore the relationships between words of each sequence in micro-blogs. Therefore, the semi-supervised methods of the present disclosure are more appropriate for micro-blog classification than other approaches, such as self-learning and semi-supervised text classification by using expectation maximization. (See Nigam, K., McCallum, A., Mitchell, T., "Semi-Supervised Text Classification Using EM"; The MIT Press, London, England, Ch. 3, (2006) 33-55; Qi, Y., Kuksa, P., Collobert, R., Sadamasa, K., Kavukcuoglu, K., Weston, J.: "Semi-Supervised Sequence Labeling with Self-Learned Features"; Proc. 9th IEEE International Conference on Data Mining (2009) 428-437, both incorporated herein by reference in its entirety).

The present disclosure describes a second method for generating feature attributes, which is simpler and decreases the processing time required for generating feature attributes.

FIG. 3 shows a training dataset 302 which is split into a training set of data (trainSetLab) and a clustering set of data (trainunLabArray). The process of FIG. 3 is similar to that of FIG. 1, however, the clustering set is applied to a k-means clustering algorithm 309. An initial cluster number (315) is assigned and the algorithm determines the cluster IDs for the data points (311). The cluster IDs are normalized (313) and concatenated with the discrete features (310). The normalized cluster IDs are formatted (312) and added to the training set (114). The cluster number 315 is increased until the stopping criterion of no decrease in the zero-one error is met.

In general, data clustering is unsupervised learning so data can be clustered into different number of clusters based on the application. In the present disclosure, these different numbers are used as feature attributes to increase classification accuracy. The initial cluster number is the first value used for determining number of clusters when applying K-means algorithm. The initial value may be 2clusters. The examples of the present disclosure use three clusters, which is the number of original sentiment classes (+, −, O). In order to decrease the time complexity this number may be doubled a teach iteration.

Algorithm describes an algorithm of the semi-supervised learning method that may used in the flowcharts of FIG. 1-4.

---

Algorithm 1. Semi-supervised learning for open domain targeted sentiment classification

---

Inputs: Label (ratio), training set (trainSet), development set (DevSet), testing set (TestSet)
Outputs: precision, recall, F1-score of classifying training data
1  Split trainset into a labelled data set (trainSetLab) equal to the ratio value and a remaining set of unlabeled data (trainSetUnLab)
2  Build the SVM HMM model (118) and train it using trainSetLab data (114) with an initial small value of the C parameter (116)
3  Calculate the zero/one error (126) of the classified DevSet (122, 124)

Algorithm 1. Semi-supervised learning for open
domain targeted sentiment classification 4  Increase the value of the C parameter (132) and repeat steps 2 and 3 until the zero/one error does not decrease (128)
5  Check the performance (238) of the SVM HMM model by using the optimum value of the C parameter of the training data (234)
6  Select only numeric values in each vector of the trainSetUnLab data and store in train UnLabArray
7  Cluster the trainUnLabArray by using k-means clustering with initial values of the number of clusters (ClusterNum) (309)
8  For each word in trainSetLab determine the cluster ID (ClusterID) to which the word belongs (311)
9  Normalize values of all ClusterIDs (311) to form ClusterIDNorm for each word in the trainSetLab data (313)
10 Concatenate 310 ClusterIDNorm as a new feature attribute to the feature vector of each word in trainSetLab to form trainSetLab+
11 Retrain the SVM HMM model by using trainSetLab+
12 Increase the value of ClusterNum (315) and iterate steps 5 to 10 until the stopping criterion is met
13 Classify TestSet by using the best SVM HMM model (430) and output the results (440)

The optimization process conducted by using steps 2, 3 and 4 is the same optimization method illustrated in FIG. 1 for finding optimum value of the C parameter. In step 6, numeric values are selected which represent neural features and skip discrete attributes for improving accuracy of data clustering. In step 7, the k-means algorithm for clustering unlabelled data is used while the number of clusters is increased iteratively in step 12. (See Abudalfa, S., Mikki, M.: "K-Means Algorithm with a Novel Distance Measure"; Turkish Journal of Electrical Engineering & Computer Sciences, 21, 6 (2013) 1665-1684, incorporated herein by reference in its entirety). The normalization process in step 9 is calculated by dividing each cluster ID (ClusterID) by the total number of clusters (ClusterNum). Thus, the values of normalized cluster IDs (ClusterIDNorm) fall in the range [0, 1]. This normalization process ensures values of the new generated attributes are close to values of other neural features included in the dataset. As a result, the samples will have improved discrimination and classification accuracy will increase. The stopping criterion of step 12 is defined as the iterative step in which the performance of the learned SVM HMM (step 5) does not improve after increasing the value of ClusterNum.

Supervised Learning with Dynamic Generation of Feature Attributes

This solution is similar to solution of "semi-supervised learning with dynamic generation of feature attributes" which is represented in Algorithm 1. However, all of the training set (trainSet) is used as labelled data instead of splitting the training set into labelled and unlabelled data when training the SVM HMM model. This checks the accuracy of applying the method of dynamic generation of feature attributes to the supervised learning algorithm.

In order to save memory and time, only half of the training data was used when conducting the clustering process for generating feature attributes. The output was reported by selecting the maximum achieved performance when applying incremental generation of feature attributes. If the generated feature attributes do not improve the performance, then the results are provided by the original supervised learning which does not use the additional feature attributes.

Figure 4:
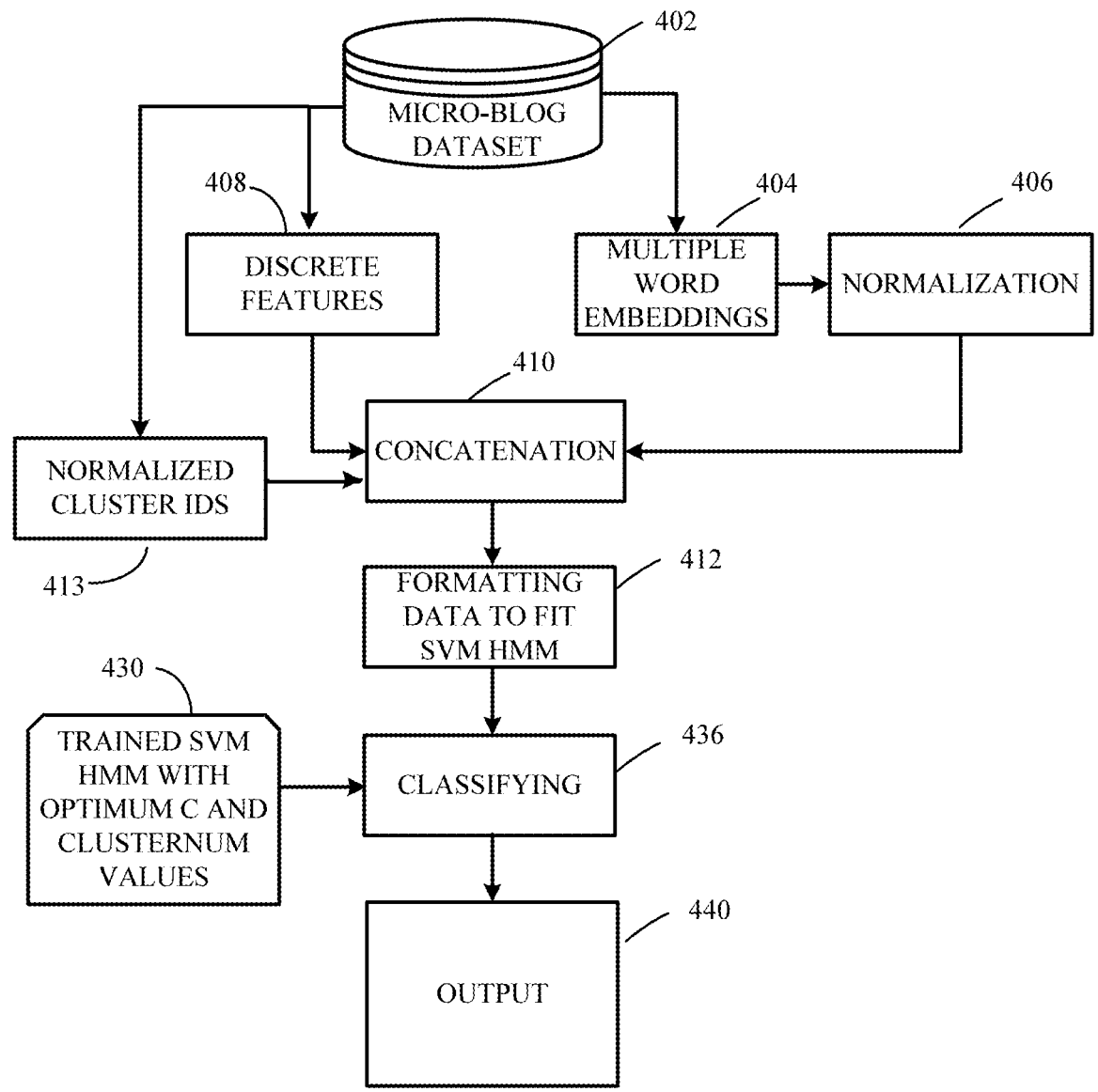
FIG. 4 is a flowchart of determining targets and sentiments in a dataset of micro-blogs using a trained SVM HMM model.

FIG. 4 illustrates a flowchart for applying the methods of FIGS. 1-3 and Algorithm 1 to provide a report regarding sentiment analysis in a set of micro-blogs.

A micro-blog dataset 402 is applied to a multiple word embeddings selection 404 to convert the blog words to vectors. The resulting vectors are normalized at 406. The normalized vectors are concatenated with discrete features 408. A portion of the microblog dataset is clustered and the normalized cluster IDs are concatenated with the normalized vectors and discrete features. The concatenated data is formatted to fit the SVM HMIN and classified using the trained SVM HMM with optimum C parameter and optimum cluster number values (430) as described previously with respect to FIG. 3. The classified data is then output 440 as a report, a graph, a chart or a 3-D representation. The formatting data identify the targets of the sentiment classification and the output reports the numbers of positive, negative and neutral sentiments identified towards the targets.

The methods of classifying micro-blogs to determine targets and sentiments may have application in many fields, such as marketing, political poling, research to determine sites for businesses, research to determine customer needs, such as for solar panels or improvements to existing products and such like.

Figure 5:
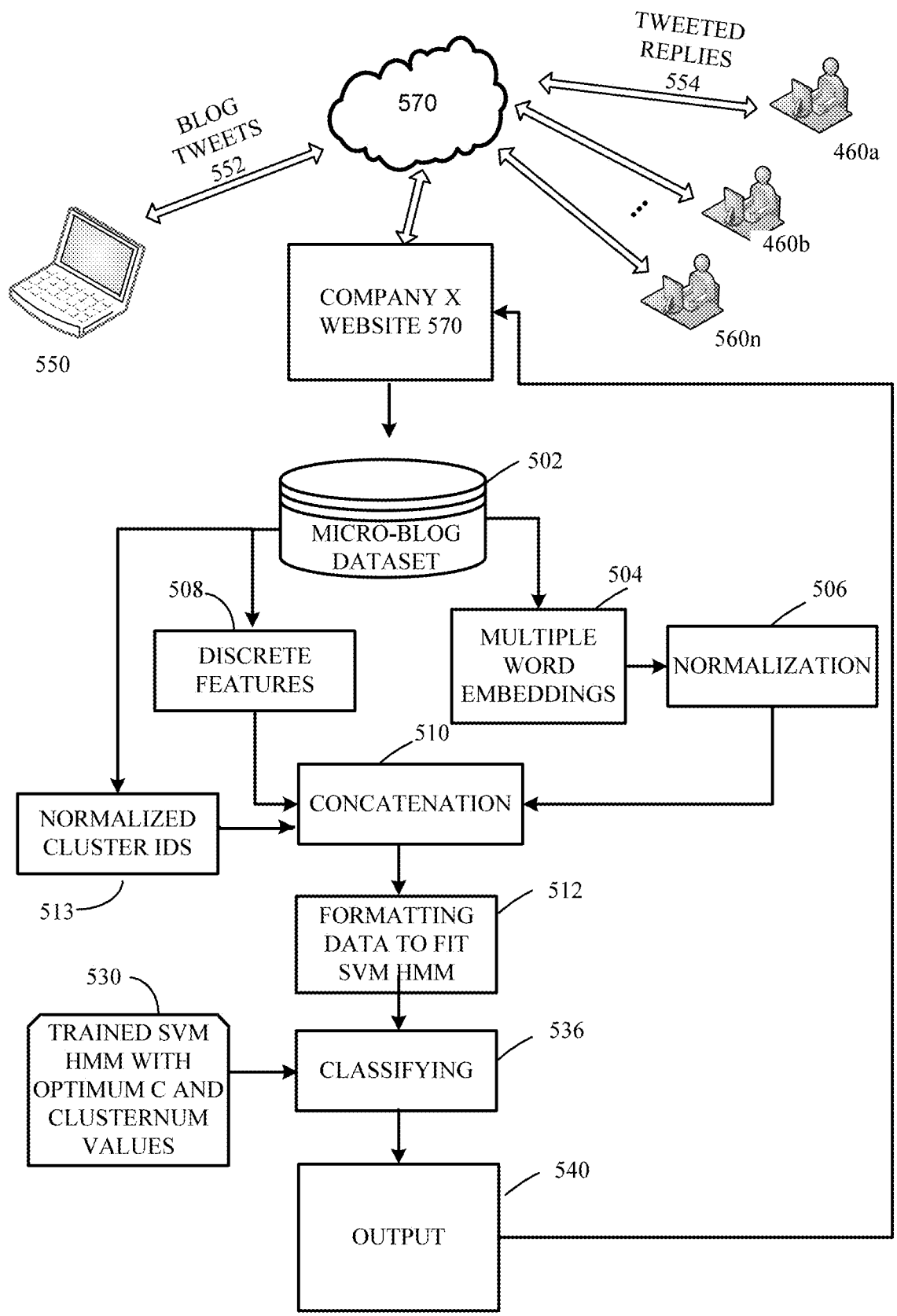
FIG. 5 is an example of sentiment analysis in a dataset of marketing micro-blogs using a trained SVM HMM model.

FIG. 5 illustrates a non-limiting example of using the trained semi-supervised based SVM HMM in a marketing campaign.

An online marketer 550 running an advertising campaign may desire to generate business for a company X having a shopping website 570 with a plurality of products Y. Rather than flooding customers with discount coupons for every product, company X wishes to send only those coupons likely to be relevant to the customer. In a non-limiting example, the company may be a grocer, and the products may be different types of breakfast cereal.

In order to generate the set of micro-blogs, company X may post a tweet or a series of tweets 552 identifying a general field of products without biasing the targeted consumer (460a, 460b, . . . , 460n), such as "Breakfast cereal was a staple at my house when I was growing up. Likes and dislikes?".

In some instances, there may be thousands of tweets 554 in response to the company's initial tweet. Traditional SVM HMM may not be able to handle such a preponderance of data and the processing time and costs may be very large. A micro-blog dataset (502) represents the collection of tweets (554).

The SVM HMM of the present disclosure shortcuts the traditional supervised SVM HMM process by concatenating (510) discrete features (508) with the micro-blog vectors after embedding (504) and normalization (506). In a non-limiting example, targets and sentiments may be the brand names of the cereals and/or may include cereal categories, such as organic, nutritional, sweet, crunchy, cooked, cold, etc. Additionally, k-means clustering and normalization (513) may be performed on a subset of the micro-blog data and concatenated with the discrete features and normalized vectors. The k-means clustering may determine degrees of difference between the sentiments of the tweets. After formatting the concatenated data (512), the formatted data is applied to the trained SVM HMM (530) and classified (536).

The output 540 may list the brand names of the cereals and identify the numbers of positive and negative tweets received for each brand. Additionally or alternatively, the output may identify the category of cereal. The output may match the brand name of the most favored cereals to a coupon for that cereal which is provided by Company X. Additionally or alternatively, the positive and negative sentiments towards categories of cereal may be output. The categories may be matched with brand names of cereals in those categories and a coupon or series of coupons may be sent to the consumer. Company X may further make purchasing decisions using the generated output. For example, Company X may decide to purchase more of a particular brand or less of a particular type, such as cooked cereal.

Figure 6:
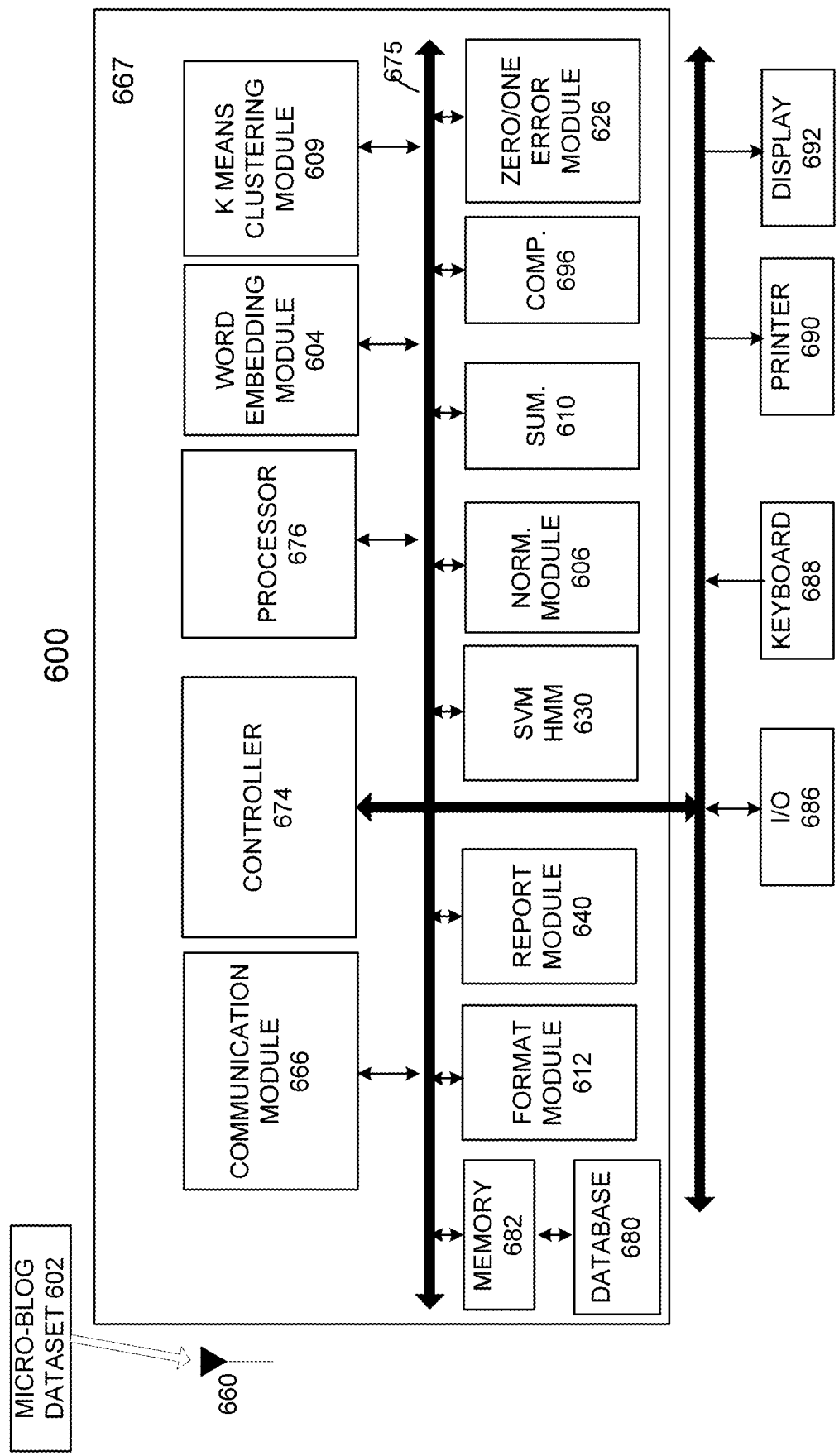
FIG. 6 illustrates the computing environment for sentiment analysis.

FIG. 6 illustrates a computer system 667 for performing the steps described above and as illustrated in FIG. 1-FIG. 5. The computer system of FIG. 6 includes a communication module 666 at which microblog dataset 602 may be received wirelessly. Alternatively, the microblog dataset may be received through I/O port 686. Communication bus line 675 provides a communication pathway to connect the components of computer system 667. Controller 674 is configured to instruct the processor 676 to access program instructions stored in memory 682 to apply a section of the micro-blog dataset to the K means clustering module 609, apply the micro-blog dataset to the word embedding module 604, access the discrete features from database 680, memory 682 or alternatively from inputs received at I/O port 686 or communication module 666. The controller furthers the results from the word embeddings module 604 and the K means clustering module 609 to the normalization module 606. The normalization results are forwarded to the summer 610 for concatenation with the discrete features. The controller is configured to apply the normalization results to the format module 612 for formatting to match the format required to input the normalized, formatted microblog dataset to the SVM HMM module 630. A comparator 696 is included to compare the zero-one error calculated by zero-one error module 626 during the SVM HMM module training. The processor further increases the cluster number and sends the new number to the K-means clustering module. The SVM HMM module 630 is configured to classify the formatted micro-blog data. The controller is further configured to receive the classified data and instruct the processor to prepare a report indicating the targets and sentiment polarities with reporting module 640. The controller is operatively connected to the communication module 666, I/O port 686, printer 690 and display monitor 692 to output the report.

The first embodiment is illustrated with respect to FIG. 1-6. The first embodiment describes a semi-supervised learning method for dynamically generating feature attributes in open domain targeted sentiment classification of a dataset of microblogs, comprising training, with a computing system 667 having circuitry configured for modelling and processing, a hidden Markov model support vector machine (SVM HMM) by the steps of dynamically generating feature attributes by combining pre-trained word embeddings (104) from a plurality of different sources to form a first training dataset, normalizing (106) the first training dataset to generate a normalized training dataset, concatenating, with a summer 610, discrete features with the normalized training set to form a second training dataset, formatting (112) the second training dataset. The method further includes initializing a C parameter (116), applying the second training dataset and the C parameter to SVM HMM (120), and training the SVM HMM to classify (124) the second training dataset set by word frequency and sentiment. The training includes generating a development dataset (122) by selecting a subset of the second dataset, classifying the development dataset with the SVM HMM, calculating a first zero/one error (126) of the classified development dataset, comparing (at 128 by comparator 696) the first zero/one error to an initial zero/one error value to determine whether the first zero/one error is less than the threshold, if the first zero/one error equals the initial zero/one error value, then stop training the SVM HMM, if the first zero/one error is less than the initial zero/one error value, increasing the C parameter (132), reclassifying the development dataset, calculating a second zero/one error using the reclassified development dataset, comparing the second zero/one error to the first zero/one error value to determine whether the second zero/one error is less than the first zero/one error, if the second zero/one error equals the first zero/one error value, stop training the SVM HMM, if the second zero/one error is less than the first zero/one error value, repeating the steps of increasing the value of the C parameter, reclassifying the development set, and calculating the zero/one error until a current zero/one error equals a previous zero/one error, then stop training the SVM HMM.

The method continues by identifying, by the computing system, sentiment polarities within a dataset of micro-blogs, by word embedding the dataset of micro-blogs, normalizing the word embedded dataset of micro-blogs, formatting the normalized word embedded dataset of micro-blogs to form a formatted dataset, classifying the formatted dataset by word frequency and sentiment by applying the formatted dataset to the trained SVM HMM, and outputting a sentiment analysis of the dataset of micro-blogs.

The method includes testing the trained SVM HMM by the steps of classifying a dataset of testing data 202 by using word embeddings extracted from the dataset of testing data, normalizing the word embedding of the testing data, concatenating discrete features with the word embedded testing data formatting the normalized word embedded dataset of microblogs to generate a formatted testing dataset, classifying the formatted testing dataset by applying the formatted dataset to the trained SVM HMM, and calculating metrics (238) of the classified testing dataset, wherein calculating metrics further comprises calculating, by the computer system, at least one of an evaluation measure for named entity recognition (NER) and an evaluation measure for sentiment analysis (SA) scores.

Each of the evaluation measures for NER and the SA comprises at least one of precision, recall and F1 scores.

The discrete features include at least one of surface features, linguistic features, clustering features including cluster length, and sentiment lexicon features.

The method further comprises selecting a subset of the training dataset, k-means clustering the subset (309), determining the cluster IDs (311) for the training dataset, normalizing (313) the cluster IDs and concatenating (310) the normalized cluster IDs with the second dataset.

Word embedding data extracted from micro-blogs further comprises converting each microblog to a numeric vector.

Normalizing the dataset of micro-blogs further comprises calculating the norm of each vector so that all numeric values of each vector fall in the range between −1 and 1 based on the following equation:

$$X_{new} = 2\left(\frac{X - X_{min}}{X_{max} - X_{min}} - \frac{1}{2}\right).$$

Formatting a dataset further comprises fitting the format of each normalized vector to represent collapsed labels selected from the group comprising b-negative labels, b-neutral labels, b-positive labels, i-negative labels, i-neutral labels, i-positive labels and o labels.

Selecting the subset of the second dataset comprises selecting a fold of the second dataset.

Calculating the zero-one error comprises determining a percentage of the classified development set which has at least one misclassified label.

The initial value of the C parameter is 1. Increasing the C parameter includes selecting the increase from a range of 1 to 550 with a step increase of 10.

Outputting a sentiment analysis of the dataset of micrologs comprises determining a list of named entities in the dataset of microblogs, and listing each named entity in the dataset of microblogs with a polarity of a sentiment associated with the named entity, wherein the polarity is positive, negative or neutral.

The second embodiment is illustrated by FIG. 1-6. The second embodiment describes a method for determining sentiment in a dataset of micro-blogs 402, comprising word embedding (404), with a computing system 667 having circuitry configured for modelling and processing, the dataset of micro-blogs, normalizing (406) the word embedded dataset of micro-blogs, formatting the normalized word embedded dataset of micro-blogs to generate a formatted dataset, classifying the formatted dataset by applying the applying the formatted dataset to a trained SVM HMM (430), and outputting (440) a sentiment analysis of the dataset of micro-blogs.

The step of outputting a sentiment analysis of the dataset of microblogs comprises determining a list of named entities in the dataset of microblogs, and listing each named entity in the dataset of microblogs with a polarity of a sentiment associated with the named entity, wherein the polarity is positive, negative or neutral.

The third embodiment is illustrated by FIG. 1-6. The third embodiment describes a non-transitory computer readable medium having instructions stored therein that, when executed by one or more processors, causes the one or more processors to perform a semi-supervised learning method for generating feature attributes in open domain targeted sentiment classification of a dataset of microblogs, comprising a semi-supervised learning method for generating feature attributes in open domain targeted sentiment classification of a dataset of microblogs, comprising training, with a computing system 667 having circuitry configured for modelling and processing, a hidden Markov model support vector machine (SVM HMM) by the steps of dynamically generating feature attributes by combining pre-trained word embeddings (104) from a plurality of different sources to form a first training dataset, normalizing (106) the first training dataset to generate a normalized training dataset, concatenating, with a summer 610, discrete features with the normalized training set to form a second training dataset, selecting a subset of the training dataset, k-means clustering the subset (309), determining the cluster IDs (311) for the training dataset, normalizing (313) the cluster IDs and concatenating (310) the normalized cluster IDs with the second dataset to form a third dataset and formatting (112) the third dataset. The non-transitory computer readable medium semi-supervised learning method further includes initializing a C parameter (116), applying the second training dataset and the C parameter to the SVM HMM (120), and training the SVM HMM to classify (124) the second training dataset set by word frequency and sentiment. The training includes generating a development dataset (122) by selecting a subset of the second dataset, classifying the development dataset with the SVM UMM, calculating a first zero/one error (126) of the classified development dataset, comparing (at 128 by comparator 696) the first zero/one error to an initial zero/one error value to determine whether the first zero/one error is less than the threshold, if the first zero/one error equals the initial zero/one error value, then stop training the SVM HMM, if the first zero/one error is less than the initial zero/one error value, increasing the C parameter (132), reclassifying the development dataset, calculating a second zero/one error using the reclassified development dataset, comparing the second zero/one error to the first zero/one error value to determine whether the second zero/one error is less than the first zero/one error, if the second zero/one error equals the first zero/one error value, stop training the SVM HMM, if the second zero/one error is less than the first zero/one error value, repeating the steps of increasing the value of the C parameter, reclassifying the development set, and calculating the zero/one error until a current zero/one error equals a previous zero/one error, then stop training the SVM HMM.

The non-transitory computer readable medium semi-supervised learning method continues by identifying, by the computing system, sentiment polarities within a dataset of micro-blogs, by word embedding the dataset of micro-blogs, normalizing the word embedded dataset of micro-blogs, formatting the normalized word embedded dataset of microblogs to form a formatted dataset, classifying the formatted dataset by word frequency and sentiment by applying the formatted dataset to the trained SVM HMM, and outputting a sentiment analysis of the dataset of micro-blogs.

The non-transitory computer readable medium semi-supervised learning method further includes calculating metrics by calculating, by the computer system, at least one of an evaluation measure for named entity recognition (NER) and an evaluation measure for sentiment analysis (SA), wherein each of the evaluation measures for NER and SA scores comprise at least one of precision, recall and F1 scores.

Normalizing a dataset of micro-blogs further comprises calculating the norm of each vector so that all numeric values of each vector fall in the range between −1 and 1 based on the following equation:

$$X_{new} = 2\left(\frac{X - X_{min}}{X_{max} - X_{min}} - \frac{1}{2}\right).$$

Experiments to test the efficiency of using the semi-supervised for target-dependent sentiment analysis were developed. The measurement tools and hardware platform specifications are described in Tables 1 and 2 respectively.

TABLE 1

Tools and programs

| Tool | Ver | Purpose |
|---|---|---|
| Python | 2.7 | Extracting Features, building and learning models for developing experiments, classifying micro-blogs, and computing results |
| Anaconda | 4.2.0 | Open data science platform powered by Python for providing development environment that, facilitates developing our experiments |
| Spyder | 2.3.8 | Graphical platform for editing, testing and debugging Python codes |
| MS Excel | 2016 | Analyzing data |
| Vim | 7.4 | Text editor for editing huge training and testing data files |

TABLE 2

Platform specifications

| Component | Specification |
|---|---|
| CPU | Intel(R) Core (TM) i7-3720 3.40 GHZ |
| Memory | 8.00 GB |
| OS | Windows 8 (64-bit) |

The experiments were conducted using the corpus (dataset) that was originally collected by Mitchell et al. which is available publicly. (See Mitchell, 2013). This corpus was used by other related works and the experimental results of the present disclosure were compared to the results of Mitchell et al., Zhang et al., Li et al. and Bojanowski et al. The corpus includes both English and Spanish tweets where each word (token) is located on a separated line. Table 3 shows statistics of the corpus which consists of 10 folds. Each fold was divided into training, testing, and development (dev) sets. "#+" refers to the number of identified positive sentiments, "#−" refers to the number of identified negative sentiments, and "#0" refers to the null sentiments which cannot be classified as either positive or negative.

TABLE 3

Dataset for open domain targeted sentiment classification

| Domain | #Sent | #Entitites | #+ | #− | #0 |
|---|---|---|---|---|---|
| English | 2,350 | 3,288 | 707 | 275 | 2,306 |
| Spanish | 5,145 | 6,658 | 1,555 | 1,007 | 4,096 |

A fold refers to a representative section of the data. Typically, in learning models, the data is split into a K number of folds, where each fold is used as a testing site. For a 5-Fold cross validation (K=5), the data set is split into 5 folds. In the first iteration, the first fold is used to test the model and the rest are used to train the model. In the second iteration, a $2^{nd}$ fold is used as the testing set, while the rest serve as the training set. This process is repeated until each fold of the 5 folds has been used as the testing set.

Formatting Data and Feature Engineering

To adapt the public dataset of Mitchell, the feature vectors were reformatted to fit the model of the present disclosure. The data format was reformatted to fit the format used by SVM HMM. The data was formatted to represent collapsed labels (b-negative, b-neutral, b-positive, i-negative, i-neutral, i-positive, and o). Numerous datasets were prepared as described briefly in Table 4. Only discrete features were included when checking performance using these features alone. This dataset result is referred to as "Discrete_Data" (1).

TABLE 4

Summary of the prepared datasets

| | Dataset | Description |
|---|---|---|
| 1 | Discrete_Data | Includes only discrete features that are used by Mitchell et al. [Mitchell, 2013] |
| 2 | Word2VecZhang | Includes only word2vec embeddings features that are included by Zhang et al. [Zhang, 2015] |
| 3 | Word2VecZhangNorm | Normalized version of "Word2VecZhang" dataset |
| 4 | Discrete_Word2VecZhangNorm | Combines both "Discrete_Data" and "Word2VecZhangNorm" dataset |
| 5 | Word2VecPolyglot | Includes wor2vec embeddings which are used by Li et al. [Li, 2017] |
| 6 | Word2VecPolyglotNorm | Normalized version of "Word2VecPolyglot" dataset |
| 7 | Discrete_Word2VecPolyglotNorm | Combines both "Discrete_Data and Word2VecPolyglotNorm" |
| 8 | Word2VecBothPolyglot&ZhangNorm | Combines both "Word2VecPolyglotNorm" and "Word2VecZhangNorm" datasets |
| 9 | DiscW2VPolyglot&ZhangNorm | Combines both "Discrete_Data" and "Word2VecBothPolyglot&ZhangNorm" datasets |
| 10 | Word2VecBojanowski | Includes wor2vec embeddings of the third source [Bojanowski, 2017] |
| 11 | Word2VecBojanowskiNorm | Normalized version of "Word2VecBojanowski" dataset |
| 12 | Discrete_Word2VecBojanowskiNorm | Combines both "Discrete_Data" and "Word2VecBojanowskiNorm" |
| 13 | W2VpolyglotZhangBojanowskiNorm | Combines "Word2VecZhangNorm", "Word2VecPolyglotNorm", and "Word2VecBojanowskiNorm" |
| 14 | DW2VpolyglotZhanBojanowskiNor | Combines both "Discrete_Data" and "W2VPolyglotZhangBojanowskiNorm" |

The same discrete features that were generated by Mitchell et al. and used by Zhang et al. and Li et al. were used as shown in Table 5.

TABLE 5

Discrete features

Surface Features
binned word length, message length, sentence position; Jerboa, features; word identity; word lengthening; punctuation characters, has digit; has dash; is lower case; is 3 or 4 letters; first letter capitalized; more than one letter capitalized, etc.
Linguistic Features
function words; can syllabify; curse words; laugh words; words for good/bad; slang words; abbreviations; intensiers; subjective suffixes and prefixes (such as diminutive forms); common verb endings; common noun endings
Brown Clustering Features
cluster at length 3; cluster at length 5
Sentiment Lexicon Features
is sentiment-bearing word; prior sentiment polarity Data was also prepared that includes only the features of pre-trained word2vec embeddings provided by Zhang et al. This data was referred to as "Word2VecZhang" (2) which includes feature vectors of size 100 attributes. The "Word2VecZhang" data was normalized and named "Word2VecZhangNorm" (3). A merged dataset combining both discrete and normalized word2vec embeddings was formed to check the efficiency of increasing performance, and named "Discrete_Word2VecZhangNorm" (4).

Additionally, data was prepared that includes pre-trained wor2vec embeddings provided by Al-Rfou et al. which are used by Li et al. (See Al-Rfou, R., Perozzi, B., Skiena, S.: "Polyglot: Distributed Word Representations for Multilingual NLP"; Proc. 17th Conference on Computational Natural Language Learning (2013) 183-192; and Li, 2017, each incorporated herein by reference in their entirety). These word2vec embeddings are available online and can be downloaded freely. Each vector of this word2vec embeddings contains 64 numeric values. The dataset is called "Word2VecPolyglot" (5) and its normalized version is called "Word2VecPolyglotNorm" (6). These normalized word2vec embeddings were merged with the discrete features and called "Discrete_Word2VecPolyglotNorm" (7). Word2VecPolyglotNorm" and "Word2VecZhangNorm" were merged to build data that includes both representations of word2vec embeddings. The combined version is called "Word2VecBothPolyglot&ZhangNorm" (8) and the dataset which includes the discrete features is called "DiscW2VPolyglot&ZhangNorm" (9).

Additionally, a form of data that includes a third source of pretrained word embeddings called fastText was prepared. (See Bojanowski, P., Grave, E., Joulin, A., Mikolov, T.: "Enriching Word Vectors with Subword Information" Transactions of the Association for Computational Linguistics, 5 (2017) 135-146, incorporated herein by reference in its entirety). This representation of word2vec embeddings has dimension equals 300 attributes and it is publically available online. The resulting dataset is called "Word2VecBojanowski" (10) and the normalized version is called "Word2VecBojanowskiNorm" (11). The normalized version was merged with the discrete features and called "Discrete_Word2VecBojanowskiNorm" (12). All three sources of word2vec embeddings were merged into one dataset called "W2VPolyglotZhangBojanowskiNorm" (13). Combination of the discrete features with "W2VPolyglotZhangBojanowskiNorm", the results in a dataset is called "DW2VPolyglotZhangBojanowskiNorm" (14). The merging of these sets is represented at the concatenate step 110 of FIG. 1.

Using Cluster IDs as Features

Aspects of the present disclosure describe an improvement to the performance of the open domain target sentiment models of Mitchell et al. (See Mitchell, 2013). These models are incorporated as a first step towards open domain sentiment classification. Since the numerical features of the CRF model could not be used, the data was clustered to different cluster sets and cluster IDs (integer values) were included as an additional feature attribute. The added feature attribute represents the cluster which covers the corresponding word in the corpus.

Next, word embeddings representing each word in the corpus were found by using the pre-trained word2vec embeddings provided by Zhang et al. (See Zhang, 2015). Then, the data of word2vec embeddings was clustered for all entities in each tweet in the corpus. Finally, cluster IDs were included as an additional feature attribute to the discrete feature attributes of Mitchell. Clustering of a part of the training dataset is shown in FIG. 3 at steps 309 and 311, normalization at 313 and concatenation with the discrete features and word embeddings at 310.

This method was applied to the $2^{nd}$ fold of the corpus available in the implementation code of Mitchell et al. K-means clustering was used for clustering all word2vec embeddings. The number of the word2vec embeddings (including both training and testing data) is 35,681 vectors. After adding cluster IDs as a feature attribute to the used dataset, the efficiency of adding these attributes by training and testing all models of Mitchell et al. This experiment was conducted by modifying implementation code developed by Mitchell et al. Table 6 describes all tested models while Table 7 shows results of the experiments when using cluster granularity that is equal to 0.1%. In this experiment, acc-all and acc-Bsent metrics were used to compare the result sets with the Mitchell et al. result sets.

TABLE 6

Description of the evaluated models.

| Model | Description |
|---|---|
| Joint_CRF_Base | Baseline joint model which uses volitional entity labels that are specified by Mitchell et al. [Mitchell, 2013] and assign no sentiment directed towards the entity. |
| Joint_CRF | Joint model proposed by Mitchell et al. [Mitchell, 2013] |
| Joint_Clusters_Base | Adding clusters ids as feature attribute to Joint_CRF_Base model |
| Joint_Clusters | Adding clusters ids as feature attribute to Joint CRF_model. |
| Pipeline_CRF_Base | Baseline pipeline model which uses volitional entity labels that are specified by Mitchell et al. [Mitchell, 2013] and assign no sentiment directed towards the entity. |
| Pipeline_CRF | Pipeline model proposed by Mitchell et al. [Mitchell, 2013] |
| Pipeline_Clusters_Base | Adding clusters ids as feature attribute to Pipeline_CRF_Base |
| Pipeline_Clusters | Adding clusters ids as feature attribute to Pipeline_CRF |
| Collapsed_CRF_Base | Baseline collapsed model which uses volitional entity labels that are specified by Mitchell et al. [Mitchell, 2013] and assign no sentiment directed towards the entity. |
| Collapsed_CRF | Collapsed model proposed by Mitchell et al. [Mitchell, 2013] |
| Collapsed_Clusters_Base | Adding clusters ids as feature attribute to Collapsed_CRF_Base |
| Collapsed_Clusters | Adding clusters ids as feature attribute to Collapsed_CRF |

TABLE 7

Model evaluation results

| | | NER/SA | |
|---|---|---|---|
| | Model | Acc-all | Acc-Bsent |
| Joint | Joint_CRF_Base | 87.25 | 32.69 |
| | Joint_CRF | 87.18 | 32.05 |
| | Joint_Clusters_Base | 90.18 | 33.83 |
| | Joint_Clusters | 89.89 | 31.84 |
| Pipeline | Pipeline_CRF_Base | 87.73 | 32.01 |
| | Pipeline_CRF | 87.73 | 32.01 |
| | Pipeline_Clusters_Base | 90.3 | 37.38 |
| | Pipeline_Clusters | 90.06 | 35 |
| Collapsed | Collapsed_CRF_Base | 89.77 | 30 |
| | Collapsed_CRF | 89.77 | 30 |
| | Collapsed_Clusters_Base | 90.44 | 32.41 |
| | Collapsed_Clusters | 99.44 | 31.66 |

Table 7 demonstrates that using cluster ids as additional features attributes significantly increases the performance of open domain targeted sentiment classification. The Collapsed_Clusters_Base model outperforms all other models with respect to Acc-all metric, while the Pipeline_Clusters_Base model outperforms all other models with respect to Acc-Bsent metric, which demonstrates that collapsed models generally provide the best results. However, when focusing on the accuracy of name entity recognition, pipeline models provide the highest performance. The results of Acc-Bsent are too low (do not exceed 40%) as it is difficult to classify the beginning of the targeted entities correctly.

Sequence tagging was performed with a structural support vector machine, referred to as SVM HMM, was used in the present disclosure to perform the tagging. (See Joachims, T., Sequence Tagging with Structural Support Vector Machines", Aug. 14, 2008, "https://www.cs.cornell.edu/people/tj/svm_light/svm_hmm.html, chbr). This machine learning technique was chosen as the methods of the present disclosure involve a sequence labelling problem not solvable by traditional SVM, which too processing intensive for these datasets. Additionally, the SVM HMM model accepts numerical (continuous) or categorical (discrete) features or a combination of both.

For comparison with previous related works fair and accurate, the code provided by Li et al. was used for calculating evaluation metrics. Firstly, an optimization task for selecting best value of C parameter when using SVM HMM model was applied. The epsilon parameter was not optimized since using its default value was enough to converge to optimum accuracy while changing C parameter. The evaluation metric "zero/one-error" is one of results provided by the used when building the SVM HMM model. The "zero/one-error" metric calculates the percentage of sentences (tweets) that had at least one misclassified tag (label). The value of the C parameter which provides the lowest "zero/one-error" when classifying dev set was selected as the "best" C parameter.

The SVM HMM model was trained by using different values of the C parameter in the range between 1 into 550 with an step increase of 10. For each selected C value, the SVM HMM model was trained with the training data and the "zero/one-error" was calculated by classifying the development set (DevSet). Finally, the best C value was determined for classifying the testing data and calculating evaluation metrics (Precision, Recall, and F1-Score). Using testing data instead of DevSet data would yield a more optimum value of the C parameter, but the DevSet data provides more realistic results for identifying the sentiment related to the targets.

SVM HMM was applied to the $2^{nd}$ fold of all prepared data for English tweets of Mitchell et al. Table 8 lists the results for each dataset of Table 4. The maximum values in this table are highlighted as bold font. Experimental results show that there are 324 samples which match criteria of open domain targeted sentiment. These samples identify number of words (tokens) that are targeted as topics and have sentiments.

Since the DW2VPolyglotZhangBojanowskiNor dataset provides the best results (lowest error, lowest C parameter, highest named entity recognition scores of precision, recall and F1 score and highest sentiment analysis (SA) scores of precision, recall and F1 score) as shown in Table 8, the SVM HMM model was applied to all 10 folds of this dataset. All results provided by using both English and Spanish were reported in Table 9. This experiment uses the optimization method to find best value of C parameter that is provided by the lowest value of "zero/one-error" (Err) as illustrated in steps 326, 328, 332 of FIG. 1. The value of C parameter was stepped from 1 into 550 with increase step equals 10. The table includes also the number of observed samples (obs) and the number of samples (Pred) that are predicted correctly. The results include evaluations metrics of precision (P), recall (R), and F1-score (F1) for both name entity recognition (NER) and sentiment analysis (SA). The maximum values of classification accuracy and F1-score among all folds are highlighted by using bold and underlined font.

TABLE 8

Summary of best results provided by applying SVM HMM to the $2^{nd}$ folds of prepared datasets

| Dataset | Err | C | NER P | NER R | NER F1 | SA P | SA R | SA F1 |
|---|---|---|---|---|---|---|---|---|
| Discrete_Data | 80.66 | 111 | 69.57 | 34.57 | 46.19 | 55.9 | 27.78 | 37.11 |
| Word2VecZhang | 91.51 | 101 | 57.58 | 17.59 | 26.95 | 43.43 | 13.27 | 20.33 |
| Word2VecZhangNorm | 91.98 | 101 | 50.85 | 18.52 | 27.15 | 37.29 | 13.58 | 19.91 |
| Discrete_Word2VecZhangNorm | 75.47 | 81 | 64.5 | 45.99 | 53.69 | 48.48 | 34.57 | 40.36 |
| Word2VecPolyglot | 82.55 | 41 | 67.88 | 34.57 | 45.81 | 51.52 | 26.23 | 34.76 |
| Word2VecPolyglotNorm | 82.55 | 41 | 65.73 | 36.11 | 46.61 | 50.56 | 27.78 | 35.86 |
| Discrete_Word2VecPolyglotNorm | 75.47 | 131 | 72.22 | 56.17 | 63.19 | 55.95 | 43.52 | 48.96 |
| Word2VecBothPolyglot&ZhangNorm | 79.25 | 41 | 66.15 | 39.2 | 49.22 | 51.56 | 30.56 | 38.37 |
| DiscW2VPolyglot&ZhangNorm | 73.11 | 31 | 71.68 | 50 | 58.91 | 54.87 | 38.27 | 45.09 |
| Word2VecBojanowski | 75 | 71 | 65.91 | 44.75 | 53.31 | 49.09 | 33.33 | 39.71 |
| Word2VecBojanowskiNorm | 75 | 81 | 68.64 | 46.6 | 55.51 | 51.82 | 35.19 | 41.91 |
| Discrete_Word2VecBojanowskiNorm | 74.06 | 41 | 73.84 | 54.01 | 62.39 | 54.85 | 40.12 | 46.35 |
| W2VPolyglotZhangBojanowskiNorm | 73.58 | 31 | 69.55 | 47.22 | 56.25 | 51.36 | 34.88 | 41.54 |
| DW2VPolyglotZhangBojanowskiNor | 70.75 | 21 | 74.38 | 55.56 | 63.6 | 56.61 | 42.28 | 48.41 |

In statistical analysis of binary classification, the F1 score (also F-score or F-measure) is a measure of the accuracy of the test. It considers both the precision (P) and the recall (R) of the test to compute the score: P is the number of correct positive results divided by the number of all positive results returned by the classifier, and R is the number of correct positive results divided by the number of all relevant samples (all samples that should have been identified as positive).

The accuracy is the ratio of all samples (such as microblogs) that are classified correctly. Accuracy is calculated by using the following formula:

$$Accuracy = \frac{Correctly\_Classified\_Samples}{All\_Samples} \times 100\%$$

Precision is the ratio of samples which are correctly classified as positive to all samples classified as positive. Precision is calculated by the following formula:

$$Precision = \frac{True\_Positive\_Samples}{True\_Positive\_Samples + False\_Positive\_Samples} \times 100\%$$

Recall (also known as sensitivity or true positive rate) is the ratio of samples which are classified correctly as positive to all positive samples. Recall is calculated by the following formula:

$$Recall = \frac{True\_Positive\_Samples}{True\_Postive\_Samples + False\_Negative\_Samples} \times 100\%$$

Specificity (which also known as true negative rate) is the ratio of samples which are classified correctly as negative to all negative samples. Specificity is calculated by the following formula:

$$Specificity = \frac{True\_Negative\_Samples}{False\_Positive\_Samples + True\_Negative\_Samples} \times 100\%$$

The F1-score (also known as F-score or F-measure) is the harmonic mean of precision and recall, and its best value is 1 while the worst score is 0. It is calculated as:

$$F1-score = 2 \times \frac{Precision \times Recall}{Precision + Recall}$$

The F1-score is basically used with binary classification and there are different modifications to use it with multiclass classification such as the macro-average F1-score, and the micro-average F1 score.

The macro-average F1-score is straight forward. It is calculated by taking the average of the precision and recall of the system on different sets. Each set is generated by using a binary classifier applied to two selected classes. In micro-average F1-score, the individual true positives, true negatives, false positives, and false negatives of each set are first calculated, then the sum of these values is used to find the micro-average precision and the micro-average recall. Finally, the micro-average F1-score will be the harmonic mean of the micro-average precision and the micro-average recall. The macro-average method is used for studying how the system performs across overall sets of data. The micro-average method can be used when the dataset varies in size to come up with a specific decision.

TABLE 9

Results from applying SVM HMM to prepared datasets
for discrete and three word2vec embeddings sources

| Lang | Fold | Err | C | Obs # | Pred # | NER P | NER R | NER F1 | SA P | SA R | SA F1 |
|---|---|---|---|---|---|---|---|---|---|---|---|
| Eng | 1 | 69.34 | 101 | 347 | 311 | 69.45 | 62.25 | 65.65 | 49.52 | 44.38 | 46.81 |
|  | 2 | 70.75 | 21 | 324 | 242 | 74.38 | 55.56 | 63.6 | 56.61 | 42.28 | 48.41 |
|  | 3 | 68.87 | 51 | 346 | 274 | 67.15 | 53.18 | 59.35 | 48.18 | 38.15 | 42.58 |
|  | 4 | 73.11 | 51 | 318 | 253 | 67.59 | 53.77 | 59.89 | 49.41 | 39.31 | 43.78 |
|  | 5 | 69.34 | 61 | 340 | 259 | 67.18 | 51.18 | 58.1 | 48.65 | 37.06 | 42.07 |
|  | 6 | 68.87 | 31 | 319 | 243 | 72.43 | 55.17 | 62.63 | 51.85 | 39.5 | 44.84 |
|  | 7 | 67.92 | 31 | 309 | 218 | 70.64 | 49.84 | 58.44 | 50.0 | 35.28 | 41.37 |
|  | 8 | 69.34 | 21 | 320 | 233 | 74.68 | 54.37 | 62.93 | 60.09 | 43.75 | 50.63 |
|  | 9 | 69.34 | 61 | 346 | 295 | 69.15 | 58.96 | 63.65 | 45.76 | 39.02 | 42.12 |
|  | 10 | 69.81 | 31 | 319 | 232 | 68.1 | 49.53 | 57.35 | 48.71 | 35.42 | 41.02 |
|  | Avg | 69.67 | 46 | 329 | 256 | 70.08 | 54.38 | 61.16 | 50.88 | 39.42 | 44.36 |
| Span | 1 | 64.87 | 81 | 677 | 556 | 77.16 | 63.37 | 69.59 | 50.54 | 41.51 | 45.58 |
|  | 2 | 64.36 | 121 | 656 | 563 | 74.96 | 64.33 | 69.24 | 46.36 | 39.79 | 42.82 |
|  | 3 | 62.42 | 151 | 676 | 524 | 75.38 | 58.43 | 65.83 | 50.19 | 38.91 | 43.83 |
|  | 4 | 65.52 | 121 | 641 | 538 | 79.0 | 66.3 | 72.09 | 52.23 | 43.84 | 47.67 |
|  | 5 | 64.58 | 111 | 669 | 545 | 81.28 | 66.22 | 72.98 | 51.56 | 42.0 | 46.29 |
|  | 6 | 64.66 | 121 | 663 | 556 | 74.1 | 62.14 | 67.6 | 48.38 | 40.57 | 44.13 |
|  | 7 | 65.44 | 141 | 651 | 533 | 76.17 | 62.37 | 68.58 | 47.28 | 38.71 | 42.57 |
|  | 8 | 65.3 | 111 | 681 | 592 | 73.82 | 64.17 | 68.66 | 46.62 | 40.53 | 43.36 |
|  | 9 | 62.2 | 141 | 661 | 581 | 71.77 | 63.09 | 67.15 | 44.75 | 39.33 | 41.87 |
|  | 10 | 66.81 | 51 | 675 | 545 | 78.17 | 63.11 | 69.84 | 53.58 | 43.26 | 47.87 |
|  | Avg | 64.62 | 115 | 665 | 553 | 76.18 | 63.35 | 69.16 | 49.15 | 40.85 | 44.60 |

Semi-Supervised Learning

A method is described for applying semi-supervised learning to open domain targeted sentiment classification. First, the performance of applying a label propagation model to the open domain targeted sentiment classification is demonstrated. Second, experimental results are shown.

An experiment was devised to evaluate the effectiveness of applying a label propagation model. Only word2vec embeddings were needed for training and testing the label propagation model since this model uses only numeric data for finding the nearest neighbors. The datasets used include only feature vectors which represent each word in the dataset (no information is included for each tweet). The "W2VPolyglotZhangBojanowski Norm" dataset was used for conducting this experiment since this data includes all the pre-trained word2vec embeddings collected from the three resources (Mitchell, Zhang and Bojanowski). Different values were selected for setting the $K_{NN}$ (nearest neighbor) parameter. The ratio of labelled data used of the training set was changed. These results are reported in Table 10 using the P, R and F1 metrics. These results show that using only word2vec embeddings gives poor results as compared to the results of Table 9 as the relationships between words (tokens) in the same tweet was not considered.

TABLE 10

Summary of best result when applying
SVM HMM to the prepared datasets

| Ratio % | KNN | Pred # | KER P | KER R | KER F1 | SA P | SA R | SA F1 |
|---|---|---|---|---|---|---|---|---|
| 11 | 3 | 4205 | 4.68 | 60.8 | 8.7 | 0.48 | 6.17 | 0.88 |
| 51 | 3 | 4205 | 4.68 | 60.8 | 8.7 | 0.48 | 6.17 | 0.88 |
| 31 | 81 | 47 | 72.34 | 10.49 | 18.33 | 57.45 | 0.33 | 14.56 |
| 51 | 81 | 47 | 72.34 | 10.49 | 18.33 | 57.45 | 8.33 | 14.56 |

TABLE 10-continued

Summary of best result when applying
SVM HMM to the prepared datasets

| Ratio % | KNN | Pred # | KER P | KER R | KER F1 | SA P | SA R | SA F1 |
|---|---|---|---|---|---|---|---|---|
| 71 | 81 | 47 | 72.34 | 10.49 | 18.33 | 57.45 | 8.33 | 14.56 |
| 31 | 150 | 39 | 87.18 | 10.49 | 18.73 | 69.23 | 8.33 | 14.88 |
| 51 | 150 | 39 | 87.18 | 10.49 | 18.73 | 69.23 | 8.33 | 14.88 |
| 31 | 200 | 39 | 87.18 | 10.49 | 18.73 | 69.23 | 8.33 | 14.88 |
| 31, 51 | 250, 300 | 0 | 0 | 0 | 0 | 0 | 0 | 0 |

Semi-Supervised Learning with Dynamic Generation of Feature Attributes

The next experiment evaluated the semi-supervised based method. The ratio of the labelled data was changed to 25%, 50%, and 75% of the training data. At each selected ratio of labelled data, both supervised SVM HMM and the semi-supervised based model of the present disclosure were evaluated. Comparisons of the results from using both supervised and semi-supervised models to clarify the improvement in performance for each ratio of labelled data. With each ratio of labelled data an optimization method was run for finding the optimum value of the C parameter by finding lowest value of "zero/one-error" (Err). The C parameter value was stepped by 10 from 1 to 550. The method was applied to all folds of the DW2VPolyglotZhangBojanowskiNor dataset. Results for both English and Spanish are reported in Table 11.

TABLE 11

Average performance results of applying semi-supervised
learning with dynamic generation of feature attributes

| Lang | Model | Ratio | MR | | | SA | | |
|------|-------|-------|-----|-----|-----|-----|-----|-----|
| | | | P | R | F1 | P | R | F1 |
| Eng | Supervised | 25 | 64.65 | 48.57 | 55.08 | 45.76 | 34.19 | 38.85 |
| | Semi-Supervised | | 64.20 | 50.18 | 55.84 | 45.92 | 35.77 | 39.86 |
| | Supervised | 50 | 66.46 | 51.92 | 58.21 | 47.86 | 37.31 | 41.88 |
| | Semi-Supervised | | 66.43 | 53.46 | 59.13 | 48.34 | 38.81 | 42.97 |
| | Supervised | 75 | 68.93 | 51.86 | 59.15 | 50.56 | 38.00 | 43.36 |
| | Semi-Supervised | | 68.21 | 53.10 | 59.65 | 50.86 | 39.57 | 44.46 |
| Span | Supervised | 25 | 68.86 | 61.12 | 64.72 | 40.04 | 35.53 | 37.63 |
| | Semi-Supervised | | 67.48 | 62.97 | 65.05 | 39.90 | 37.21 | 38.45 |
| | Supervised | 50 | 73.73 | 61.18 | 66.84 | 45.42 | 37.66 | 41.15 |
| | Semi-Supervised | | 71.48 | 64.02 | 67.39 | 44.15 | 39.51 | 41.61 |
| | Supervised | 75 | 74.66 | 62.34 | 67.93 | 47.06 | 39.27 | 42.80 |
| | Semi-Supervised | | 74.31 | 63.32 | 68.27 | 46.93 | 39.98 | 43.12 |

Table 11 includes also the number of observed samples (obs) and number of samples (Pred) that are predicted correctly. The results include evaluations metrics of precision (P), recall (R), and F1-score (F1) for both name entity recognition (NER) and sentiment analysis (SA). The maximum values in this table are highlighted by using bold font.

Supervised Learning with Dynamic Generation of Feature Attributes

Further experiments were developed to evaluate the performance of merging supervised SVM HMM with the method of the present disclosure of using a semi-supervised solution for dynamic generation of feature attributes. The combined supervised learning model was applied to all 10 folds of DW2VPolyglotZhangBojanowskiNor dataset. With each fold, an optimization was run for finding the optimum value of the C parameter by finding lowest value of the "zero/one-error" (Err). The C parameter was stepped from 1 into 550 in steps of 10. A ratio of labelled data equal to 51% of the training set was used to cluster the data needed for generating feature attributes dynamically.

The results achieved by applying these experiments to both English and Spanish data are reported in Table 12. This table includes also the number of observed samples (Obs) and the number of samples (Pred) that are predicted correctly for each of the ten folds. The results include evaluation metrics of precision (P), recall (R), and F1-score (F1) for both name entity recognition (NER) and sentiment analysis (SA). The maximum values of accuracy and F1-score evaluated sentiment analysis were highlighted with bold and underlined font while the average values of all results provided when using all folds was highlighted using only bold font. With each fold, we reported results of pure supervised learning when using the generated attributes does not increase performance.

Based on the results shown in Table 12, it is clear that using three sources of word2vec embeddings decreases the effect of missed words. After using these three sources, most of the words have at least one word2vec representation. It can be noted that Bojanowski word2vec embeddings outperform the other two word2vec embeddings as shown in Table 8, (Word2VecZhangNorm, Word2VecPolyglotNorm, and Word2VecBojanowskiNorm), while concatenating all word2vec embeddings with discrete features provides the best results as shown in Table 12.

TABLE 12

Result from applying supervised learning with
dynamic generation of feature attributes

| | | | | Obs | Pred | NER | | | SA | | |
|------|------|-----|-----|-----|-----|-----|-----|-----|-----|-----|-----|
| Lang | Fold | Err | C | # | # | P | R | F1 | P | R | F1 |
| Eng | 1 | 69.34 | 101 | 347 | 316 | 68.67 | 62.54 | <u>65.46</u> | 49.37 | 44.96 | 47.06 |
| | 2 | 70.75 | 21 | 324 | 254 | 72.83 | 57.1 | 64.01 | 55.91 | 43.83 | 49.13 |
| | 3 | 68.87 | 51 | 346 | 254 | 69.29 | 50.87 | 58.67 | 50.0 | 36.71 | 42.33 |
| | 4 | 73.11 | 51 | 318 | 268 | 65.67 | 55.35 | 60.07 | 48.51 | 40.88 | 44.37 |
| | 5 | 69.34 | 61 | 340 | 260 | 66.54 | 50.88 | 57.67 | 50.0 | 38.24 | 43.33 |
| | 6 | 68.87 | 31 | 319 | 271 | 67.9 | 57.68 | 62.37 | 49.82 | 42.32 | 45.76 |
| | 7 | 67.92 | 31 | 309 | 219 | 71.23 | 50.49 | 59.09 | 50.68 | 35.92 | 42.05 |
| | 8 | 69.34 | 21 | 320 | 229 | 76.42 | 54.69 | 63.75 | 60.26 | 43.13 | <u>50.27</u> |
| | 9 | 69.34 | 61 | 346 | 288 | 70.83 | 58.96 | 64.35 | 47.57 | 39.6 | 43.22 |
| | 10 | 69.81 | 31 | 319 | 225 | 71.11 | 50.16 | 58.82 | 52.89 | 37.3 | 43.75 |
| | Avg | 69.67 | 46 | 329 | 258 | 70.05 | 54.87 | 61.43 | 51.50 | 40.29 | 45.13 |

TABLE 12-continued

Result from applying supervised learning with dynamic generation of feature attributes

| | | | | Obs | Pred | NER | | | SA | | |
|---|---|---|---|---|---|---|---|---|---|---|---|
| Lang | Fold | Err | C | # | # | P | R | F1 | P | R | F1 |
| Span | 1 | 64.87 | 81 | 677 | 576 | 76.04 | 64.7 | 69.91 | 50.17 | 42.69 | 46.13 |
| | 2 | 64.36 | 121 | 656 | 564 | 76.06 | 65.4 | 70.33 | 47.52 | 40.85 | 43.93 |
| | 3 | 62.42 | 151 | 676 | 571 | 74.61 | 63.02 | 68.32 | 48.34 | 40.83 | 44.27 |
| | 4 | 65.52 | 121 | 641 | 538 | 79.0 | 66.3 | 72.09 | 52.23 | 43.84 | 47.67 |
| | 5 | 64.58 | 111 | 669 | 604 | 79.3 | 71.6 | 75.26 | 51.49 | 46.49 | 48.86 |
| | 6 | 64.66 | 121 | 663 | 556 | 74.1 | 62.14 | 67.6 | 48.38 | 40.57 | 44.13 |
| | 7 | 65.44 | 141 | 651 | 533 | 76.17 | 62.37 | 68.58 | 47.28 | 38.71 | 42.57 |
| | 8 | 65.3 | 111 | 681 | 658 | 70.36 | 67.99 | 69.16 | 45.44 | 43.91 | 44.66 |
| | 9 | 62.2 | 141 | 661 | 665 | 66.62 | 67.02 | 66.82 | 42.11 | 42.36 | 42.23 |
| | 10 | 66.81 | 51 | 675 | 594 | 76.77 | 67.56 | 71.87 | 51.85 | 45.63 | 48.54 |
| | Avg | 64.62 | 115 | 665 | 586 | 74.90 | 65.81 | 69.99 | 48.48 | 42.59 | 45.30 |

In general, using only the label propagation model provides inferior results since it predicts each word (token) individually and does not consider the relations between tokens in the same tweet. Using a very small value of the $K_{NN}$ parameter provides a false result (the worst results) in which the number of predicted samples is greater than number of observed samples. Changing values of the $K_{NN}$ parameter changes results significantly, while changing values of the labelled ratio does not change the results as shown in Table 10.

The results achieved by the methods of the present disclosure were compared to those of previous related works. The average values achieved for all folds are listed and demonstrate that some specific folds provide better results as shown in Table 12. The results found for open domain targeted sentiment classification were summarized in Table 13. Table 13 compares these results with previous related works (CRF-P, CRF-C, CRF-J), (NN-P, NN-C, NN-J), and (SS, SS(+w), SS(+P), SS(se)). (See Mitchell, 2013; Zhang, 2015; and Li, 2017). The maximum achieved results were highlighted in bold font. It is clear that an SVM HMM model provides competitive results. The SVM HMM model (Se-Su-DFG) combined with discrete features with multiple word2vec embeddings of the present disclosure performed comparably with supervised DFG and outperformed the results of the previous related works. Additionally, the semisupervised classifier using discrete features (Se-Su-DFG) while requiring less processing time. Referring back to Table 9, it can be pointed out that some specific folds provided better results.

TABLE 13

Summary of main results provided for open domain targeted sentiment classification

| | English | | | | | | Spanish | | | | | |
|---|---|---|---|---|---|---|---|---|---|---|---|---|
| | Entity Recognition | | | Sentiment Analysis | | | Entity Recognition | | | Sentiment Analysis | | |
| Model | P. | R. | F1 | P. | R. | F1 | P. | R. | F1 | P. | R. | F1 |
| CRF-P | 65.74 | 47.59 | 55.18 | 46.8 | 33.87 | 39.27 | 71.29 | 58.26 | 64.11 | 43.8 | 35.8 | 39.4 |
| CRF-C | 54.0 | 42.69 | 47.66 | 38.4 | 30.38 | 33.9 | 62.2 | 52.08 | 56.66 | 39.39 | 32.96 | 35.87 |
| CRF-J | 59.45 | 43.78 | 50.32 | 41.77 | 30.8 | 35.38 | 66.05 | 52.55 | 58.51 | 41.54 | 33.05 | 36.79 |
| NN-P | 60.69 | 51.63 | 55.67 | 43.71 | 37.12 | 40.06 | 70.77 | 62.0 | 65.76 | 46.55 | 40.57 | 43.04 |
| NN-C | 64.16 | 44.98 | 52.58 | 48.35 | 32.84 | 38.36 | 73.51 | 53.3 | 61.71 | 49.85 | 34.53 | 40.0 |
| NN-J | 61.47 | 49.28 | 54.59 | 44.62 | 35.84 | 39.67 | 71.32 | 61.11 | 65.74 | 46.67 | 39.99 | 43.02 |
| SS | 63.18 | 51.67 | 56.83 | 44.57 | 36.48 | 40.11 | 71.49 | 61.92 | 66.36 | 46.06 | 39.89 | 42.75 |
| SS(+w) | 66.35 | 56.59 | 61.08 | 47.3 | 40.36 | 43.55 | 73.13 | 64.34 | 68.45 | 47.14 | 41.48 | 44.13 |
| SS(+P) | 65.14 | 55.32 | 59.83 | 45.96 | 39.04 | 42.21 | 71.55 | 62.72 | 66.84 | 45.92 | 40.25 | 42.89 |
| SS(se) | 63.93 | 54.53 | 58.85 | 44.49 | 37.93 | 40.94 | 70.17 | 64.15 | 67.02 | 44.12 | 40.34 | 42.14 |
| SVM HMM | 70.08 | 54.38 | 61.16 | 50.88 | 39.42 | 44.36 | 76.18 | 63.35 | 69.16 | 49.15 | 40.85 | 44.60 |
| Se-Su-DFG | 68.21 | 53.10 | 59.65 | 50.86 | 39.57 | 44.46 | 74.31 | 63.32 | 68.27 | 46.93 | 39.98 | 43.12 |
| Super-DFG | 70.05 | 54.87 | 61.43 | 51.50 | 40.29 | 45.13 | 74.90 | 65.81 | 69.99 | 48.48 | 42.59 | 45.30 |

The semi-supervised based solution (Se-Su-DFG) of the present disclosure provides competitive results with less time consuming labelling of data. The performance of this solution is close to the accuracy of dominant previous related works. The semi-supervised based solution is a good choice when there is a lack of labelled data or the data requires costly preparation (cleaning). The supervised based solution (Super-DFG) with dynamic generation of feature attributes of the present disclosure outperformed all previous models.

The present disclosure describes supervised and semi-supervised based methods with dynamic generation of feature attributes. Numerous empirical experiments are developed to show that the model outperforms all previous related works. These methods of classifying micro-blogs achieved high performance.

Based on the results of the experiments, it can be concluded that integrating discrete features with word2vec embeddings increases performance and decreases processing time of open domain targeted sentiment classification when using CRY model in comparison with using neural network (NN) models. Additionally, adding word2vec embeddings as additional feature attributes provide competitive accuracy with less implementation complexity in comparison with using the additional feature layer in a neural network as shown by Zhang, 2015. It may also be concluded that applying a SVM HMM model using discrete features with multiple word2vec embeddings to a dataset outperforms all previous related works. Additionally, the semi-supervised based solution provides competitive results with partially labelled data. The performance of the models of the present disclosure is close to or outperforms the accuracy of previous related works and requires less processing time.

It is obvious that using SVM HMM is sensitive to the selected values of the C parameter. Thus, it is important to compare performance by applying numerous optimization algorithms for finding optimum value of C parameter.

Figure 7:
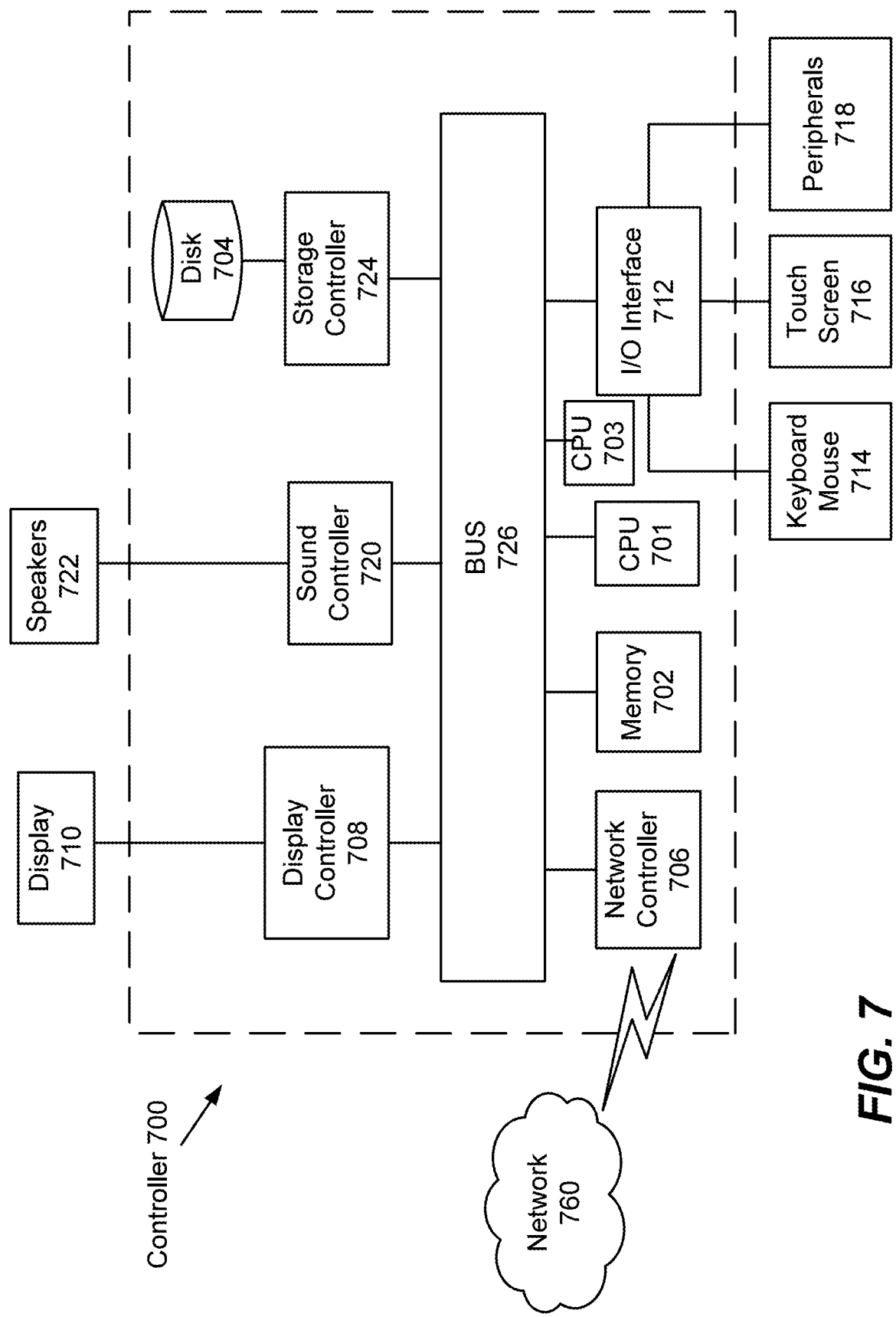
FIG. 7 is an illustration of a non-limiting example of details of computing hardware used in the computing system, according to certain embodiments.

Next, further details of the hardware description of the computing environment of FIG. 6 according to exemplary embodiments is described with reference to FIG. 7. In FIG. 7, a controller 700 is described is representative of the system 667 of FIG. 6 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
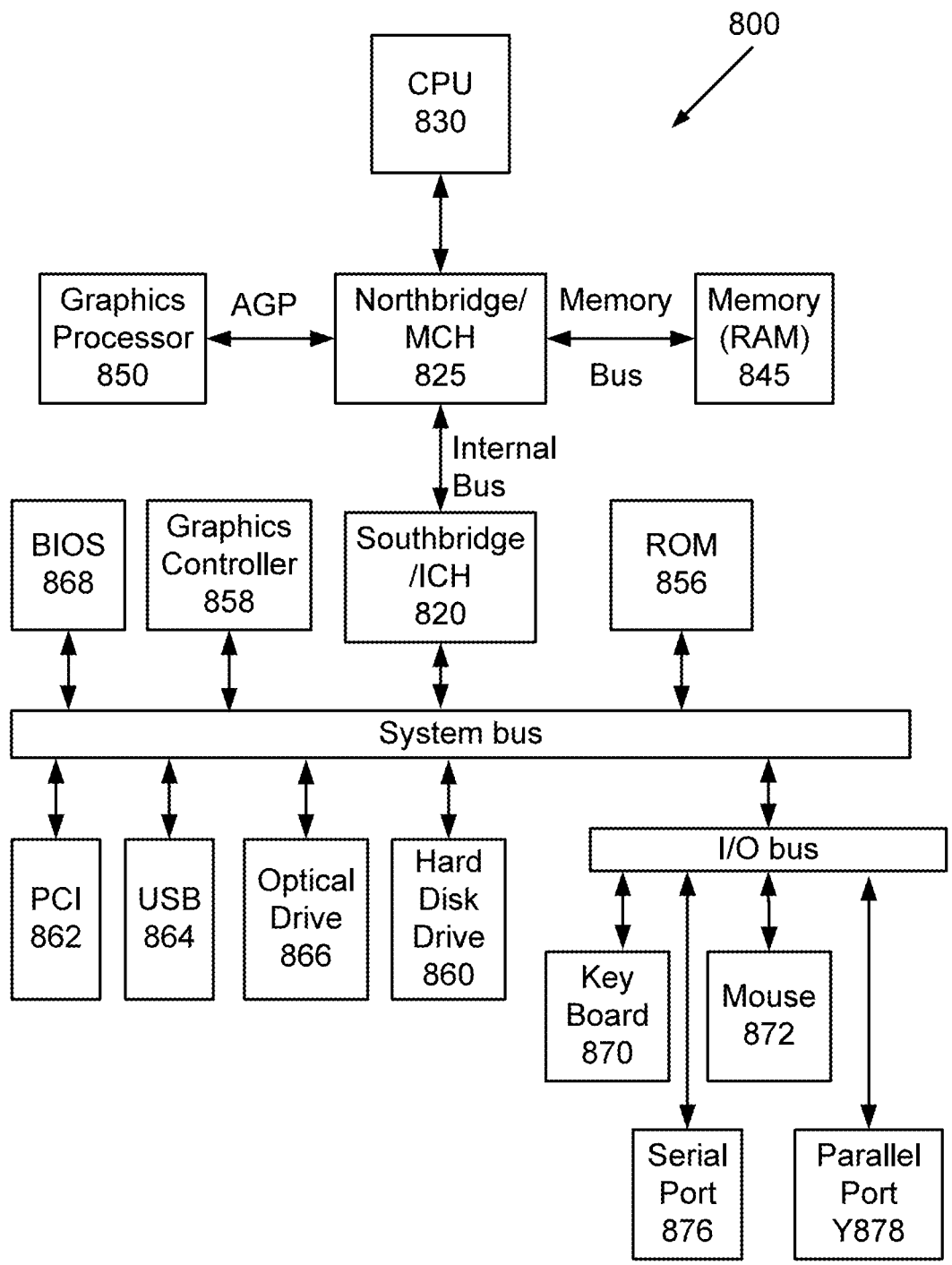
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
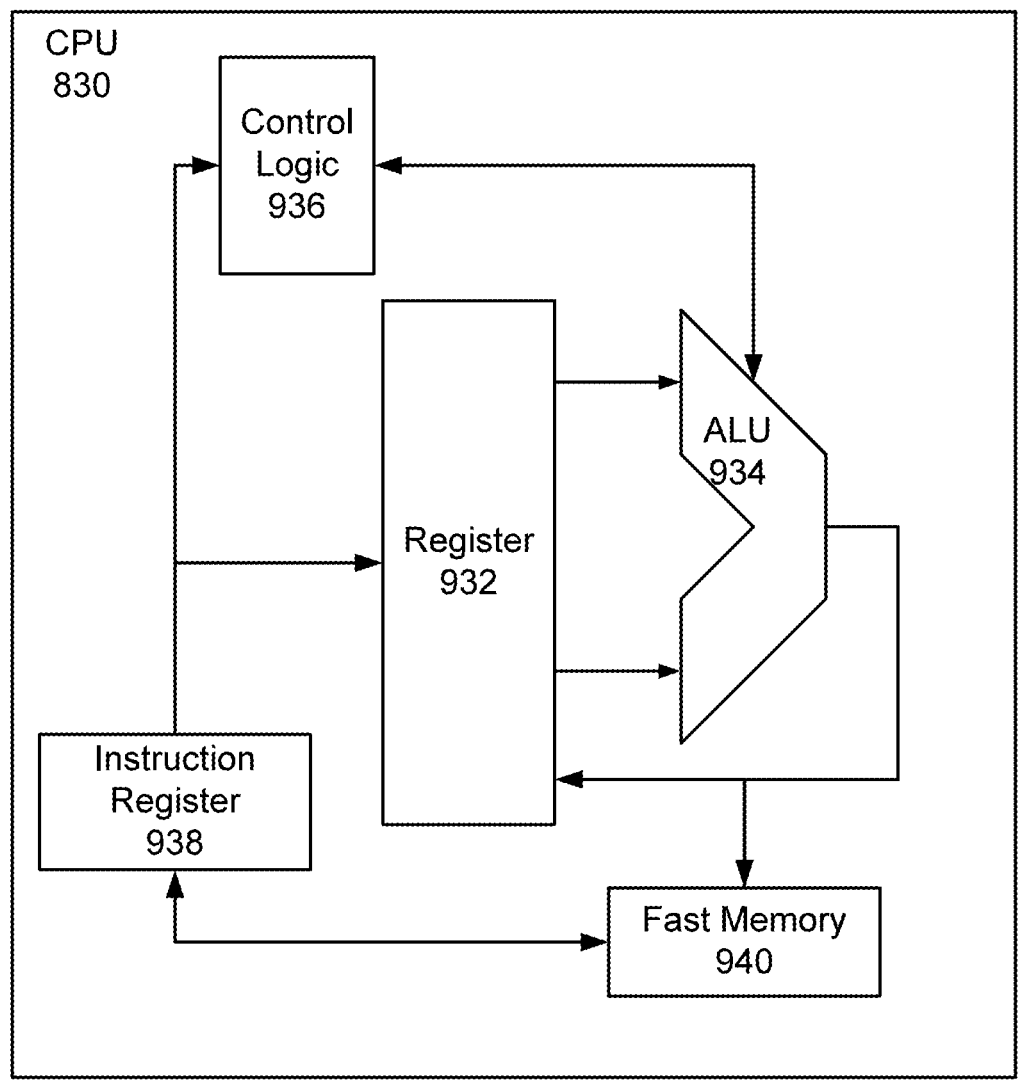
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
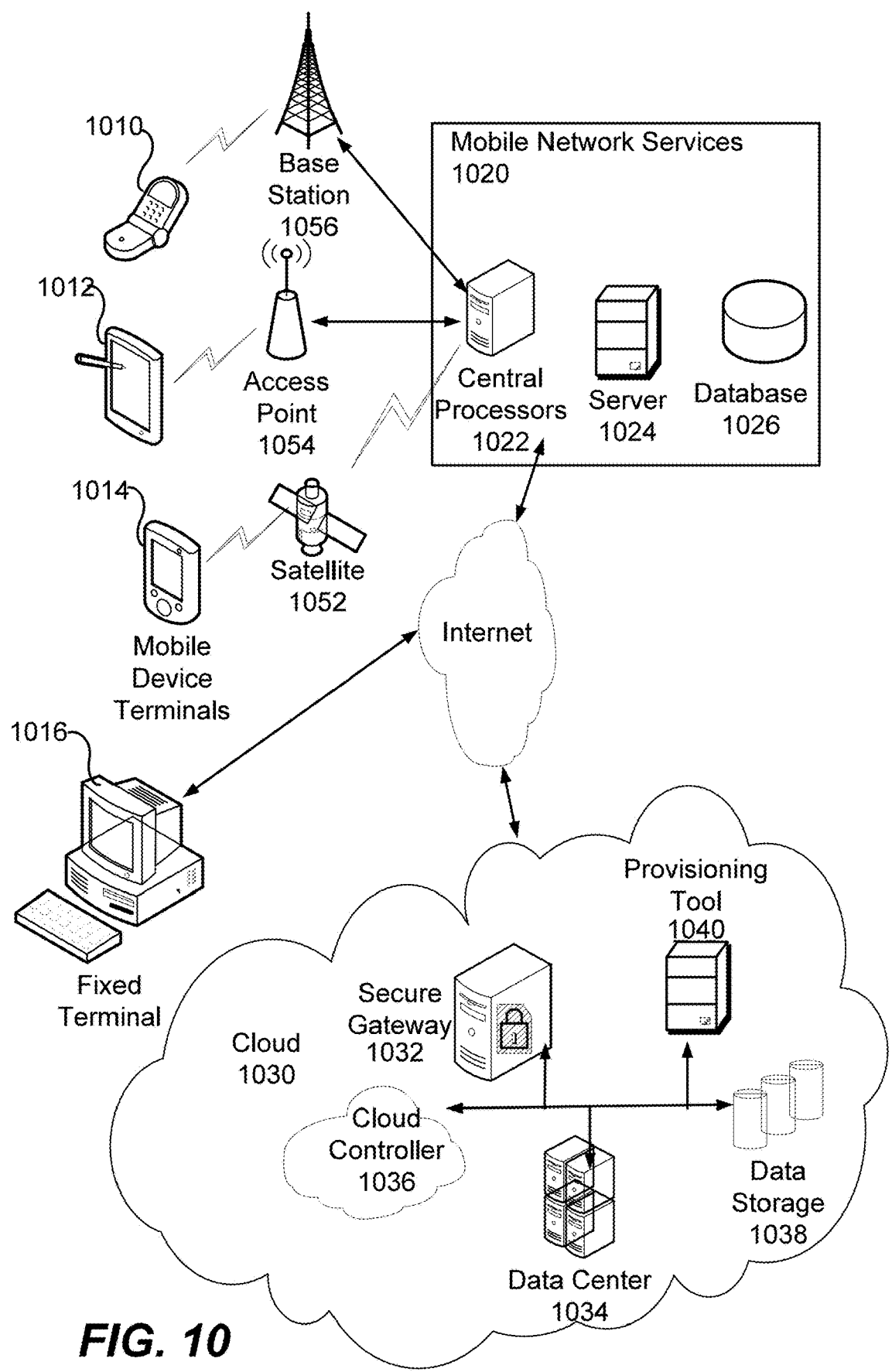
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A semi-supervised learning method for dynamically generating feature attributes in open domain targeted sentiment classification of a dataset of microblogs, comprising:
   training, with a computing system having circuitry configured for modelling and processing, a hidden Markov model support vector machine (SVM HMM), wherein the circuitry is configured to:
      dynamically generate feature attributes by
         combining pre-trained word embeddings from a plurality of different sources to form a first training dataset;
         normalizing the first training dataset to generate a normalized training dataset;
         concatenating, with a summer, discrete features with the normalized training set to generate a second training dataset;
      formatting the second training dataset;
      initializing a C parameter;
      applying the second training dataset and the C parameter to the SVM HMM;
      training the SVM HMM to classify the second training dataset set by word frequency and sentiment;
      generating a development dataset by selecting a subset of the second dataset;
      classifying the development dataset with the SVM HMI;
      calculating a first zero/one error of the classified development dataset;
      comparing the first zero/one error to an initial zero/one error value to determine whether the first zero/one error is less than the threshold;
         if the first zero/one error equals the initial zero/one error value, then stop training the SVM HMM;
         if the first zero/one error is less than the initial zero/one error value,
            increasing the C parameter;
            reclassifying the development dataset;
            calculating a second zero/one error using the reclassified development dataset;
            comparing the second zero/one error to the first zero/one error value to determine whether the second zero/one error is less than the first zero/one error;
         if the second zero/one error equals the first zero/one error value, stop training the SVM HMM;
         if the second zero/one error is less than the first zero/one error value,
            repeating the steps of increasing the value of the C parameter, reclassifying the development set, and calculating the zero/one error until a current zero/one error equals a previous zero/one error, then stop training the SVM HMM;
   identifying, by the computing system, sentiment polarities within a dataset of micro-blogs, wherein the computing system includes circuitry configured to:
      extract word embedding from the dataset of micro-blogs;

normalize the word embedded dataset of micro-blogs;
format the normalized word embedded dataset of micro-blogs to form a formatted dataset;
classify the formatted dataset by applying the formatted dataset to the trained SVM HMM; and
outputting a sentiment analysis of the dataset of micro-blogs.

2. The semi-supervised learning method of claim 1, further comprising:
testing the trained SVM HMM by the steps of:
classifying a dataset of testing data by
applying word embeddings extracted from the dataset of testing data;
normalizing the word embeddings;
concatenating discrete features with the word embedded testing data
formatting the normalized word embedded dataset of microblogs to form a formatted testing dataset;
classifying the formatted testing dataset by applying the formatted dataset to the trained SVM HMM; and
calculating metrics of the classified testing dataset.

3. The semi-supervised learning method of claim 2, wherein calculating metrics further comprises calculating, by the computer system, at least one of a named entity recognition (NER) evaluation measurement and a sentiment analysis (SA) evaluation measurement.

4. The semi-supervised learning method of claim 3, wherein the evaluation measures for NER comprise at least one of precision, recall and F1 measures and the evaluation measures for SA comprise at least one of precision, recall and F1 measures.

5. The semi-supervised learning method of claim 1, further comprising selecting a subset of the training dataset, clustering the subset by k-means clustering, determining the cluster IDs for the training dataset, normalizing the cluster IDs and concatenating the normalized cluster IDs with the second dataset.

6. The semi-supervised learning method of claim 1, the discrete features including at least one of:
surface features;
linguistic features,
clustering features including cluster length; and
sentiment lexicon features.

7. The semi-supervised learning method of claim 1, wherein extracting word embeddings from a dataset of micro-blogs further comprises converting each microblog to a numeric vector.

8. The semi-supervised learning method of claim 7, wherein normalizing the dataset of micro-blogs further comprises calculating the norm of each vector so that all numeric values of each vector fall in the range between −1 and 1 based on the following equation:

$$X_{new} = 2\left(\frac{X - X_{min}}{X_{max} - X_{min}} - \frac{1}{2}\right).$$

9. The semi-supervised learning method of claim 1, wherein formatting a dataset further comprises fitting the format of each normalized vector to represent collapsed labels selected from the group comprising b-negative labels, b-neutral labels, b-positive labels, i-negative labels, i-neutral labels, i-positive labels and o labels.

10. The semi-supervised learning method of claim 1, further comprising selecting the subset of the second dataset by selecting a fold of the second dataset.

11. The semi-supervised learning method of claim 9, further comprising calculating the zero-one error by determining a percentage of the classified development set which has at least one misclassified label.

12. The semi-supervised learning method of claim 1, further comprising initializing the C parameter to 1.

13. The semi-supervised learning method of claim 1, further comprising selecting the increase in the value of the C parameter from a range of 1 to 550 with a step increase of 10.

14. The semi-supervised learning method of claim 1, wherein outputting a sentiment analysis of the dataset of microblogs comprises
determining a list of named entities in the dataset of microblogs; and
listing each named entity in the dataset of microblogs with a polarity of a sentiment associated with the named entity, wherein the polarity is positive, negative or neutral.

15. A non-transitory computer readable medium having instructions stored therein that, when executed by one or more processors, causes the one or more processors to perform a semi-supervised learning method for generating feature attributes in open domain targeted sentiment classification of a dataset of microblogs, comprising:
training, with a computing system having circuitry configured for modelling and processing, a hidden Markov model support vector machine (SVM HMI) by the steps of:
dynamically generating feature attributes by
combining pre-trained word embeddings from a plurality of different sources to form a first training dataset;
normalizing the first training dataset to generate a normalized training dataset;
concatenating, with a summer, discrete features with the normalized training set to form a second training dataset;
formatting the second training dataset;
initializing a C parameter;
applying the second training dataset and the C parameter to a SVM HMM;
training the SVM HMM to classify the second training dataset set by word frequency and sentiment;
generating a development dataset by selecting a subset of the second dataset;
classifying the development dataset with the SVM HMI;
calculating a first zero/one error of the classified development dataset;
comparing the first zero/one error to an initial zero/one error value to determine whether the first zero/one error is less than the threshold;
if the first zero/one error equals the initial zero/one error value, the stop training the SVM HMI;
if the first zero/one error is less than the initial zero/one error value,
increasing the C parameter;
reclassifying the development dataset;
calculating a second zero/one error using the reclassified development dataset;
comparing the second zero/one error to the first zero/one error value to determine whether the second zero/one error is less than the first zero/one error;

if the second zero/one error equals the first zero/one error value, stop training the SVM HMM;

if the second zero/one error is less than the first zero/one error value, repeating the steps of increasing the value of the C parameter, reclassifying the development set, and calculating the zero/one error until a current zero/one error equals a previous zero/one error, then stop training the SVM HMM;

identifying, by the computing system, sentiment polarities within a dataset of micro-blogs, by word embeddings extracted from the dataset of micro-blogs;

normalizing the word embedded dataset of micro-blogs;

formatting the normalized word embedded dataset of micro-blogs to form a formatted dataset;

classifying the formatted dataset by applying the formatted dataset to the trained SVM HMM; and outputting a sentiment analysis of the dataset of micro-blogs.

16. The non-transitory computer readable medium semi-supervised learning method of claim 15, further comprising:

testing the trained SVM HMI by the steps of:

classifying a dataset of testing data by word embeddings extracted from the dataset of testing data;

normalizing the word embedded testing data;

concatenating discrete features with the word embedded testing data formatting the normalized word embedded dataset of microblogs to form a formatted testing dataset;

classifying the formatted testing dataset by applying the formatted dataset to the trained SVM HMM; and calculating metrics of the classified testing dataset.

17. The non-transitory computer readable medium semi-supervised learning method of claim 16, wherein:

calculating metrics by calculating, by the computer system, at least one of an evaluation measure for named entity recognition (NER) and evaluation measure for sentiment analysis (SA), wherein each of the evaluation measures comprise at least one of precision, recall and F1 scores.

18. The non-transitory computer readable medium semi-supervised learning method of claim 16, wherein normalizing a dataset of micro-blogs further comprises calculating the norm of each vector so that all numeric values of each vector fall in the range between −1 and 1 based on the following equation:

$$X_{new} = 2\left(\frac{X - X_{min}}{X_{max} - X_{min}} - \frac{1}{2}\right).$$

* * * * *